US010144416B2

(12) United States Patent
Sato

(10) Patent No.: US 10,144,416 B2
(45) Date of Patent: Dec. 4, 2018

(54) APPARATUS AND METHOD FOR CONTROLLING VEHICLE

(71) Applicant: FUJI JUKOGYO KABUSHIKI KAISHA, Tokyo (JP)

(72) Inventor: Yutaka Sato, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 15/236,946

(22) Filed: Aug. 15, 2016

(65) Prior Publication Data
US 2017/0057494 A1 Mar. 2, 2017

(30) Foreign Application Priority Data
Aug. 27, 2015 (JP) .................. 2015-167959

(51) Int. Cl.
*B60W 30/045* (2012.01)
*B60W 10/08* (2006.01)
(Continued)

(52) U.S. Cl.
CPC .......... *B60W 30/045* (2013.01); *B60W 10/08* (2013.01); *B60W 10/119* (2013.01); *B60W 10/20* (2013.01); *B60W 50/06* (2013.01); *B60W 2050/0008* (2013.01); *B60W 2050/0022* (2013.01); *B60W 2520/14* (2013.01);
(Continued)

(58) Field of Classification Search
None
See application file for complete search history.

(56) References Cited

U.S. PATENT DOCUMENTS 7,392,120 B2 * 6/2008 Matsumoto ......... B60T 8/17557
180/168
8,983,749 B1 * 3/2015 Singh ..................... B60T 8/172
701/71
(Continued)

FOREIGN PATENT DOCUMENTS

JP       10-271613 A    10/1998
JP    2013-223285 A    10/2013

OTHER PUBLICATIONS

Robert Oshana & Mark Kraeling, Software Engineering for Embedded Systems: Methods, Practical Techniques, and Applications, 2013 (Year: 2013).*
(Continued)

*Primary Examiner* — Tamara L Weber
(74) *Attorney, Agent, or Firm* — Chip Law Group

(57) ABSTRACT

An apparatus for controlling a vehicle includes a vehicle additional yaw moment calculator that calculates, based on a yaw rate of a vehicle, a vehicle additional yaw moment to be applied to the vehicle independently of a steering system, a slipping condition determiner that makes a determination as to a slipping condition of the vehicle, and an adjustment gain calculator that calculates an adjustment gain to adjust the vehicle additional yaw moment so as to reduce the vehicle additional yaw moment additional yaw moment when the vehicle is determined to be in the slipping condition, and increases the adjustment gain in accordance with a degree of a slip of the vehicle when the vehicle is determined to recover from the slipping condition.

10 Claims, 15 Drawing Sheets

(51) Int. Cl.
*B60W 10/119* (2012.01)
*B60W 10/20* (2006.01)
*B60W 50/06* (2006.01)
*B60W 50/00* (2006.01)

(52) U.S. Cl.
CPC . *B60W 2520/266* (2013.01); *B60W 2710/083* (2013.01); *B60W 2710/207* (2013.01); *B60W 2720/14* (2013.01); *Y02T 10/7258* (2013.01)

(56) References Cited

U.S. PATENT DOCUMENTS

| | | | |
|---|---|---|---|
| 9,199,639 B2 * | 12/2015 | Yamakado | B60T 8/1755 |
| 2005/0268708 A1 * | 12/2005 | Satou | B60T 8/172 |
| | | | 73/146 |
| 2006/0015238 A1 * | 1/2006 | Motoyama | B60K 23/04 |
| | | | 701/71 |
| 2013/0211678 A1 * | 8/2013 | Lee | B62D 9/002 |
| | | | 701/42 |

OTHER PUBLICATIONS

Office Action received for Japanese Patent application No. 2015-167959, dated Feb. 28, 2017, 2 pages of office action including 3 pages of English translation.
Kanou et al., "Experimental Study on Cooperative Traction Control With Yaw-Rate Control for Electric Vehicle", The Institute of Electrical Engineers of Japan, IIC-07-83, 2007, pp. 77 to 82.

* cited by examiner

APPARATUS AND METHOD FOR CONTROLLING VEHICLE

CROSS-REFERENCE TO RELATED APPLICATIONS

The present application claims priority from Japanese Patent Application No. 2015-167959 filed on Aug. 27, 2015, the entire contents of which are hereby incorporated by reference.

BACKGROUND

1. Technical Field

The present invention relates to an apparatus and a method for controlling a vehicle.

2. Related Art

Japanese Unexamined Patent Application Publication No. H10-271613, for example, discloses a driving control apparatus for an electric vehicle that is capable of driving left and right rear wheels independently and which implements driving stability control which controls moment about the center of gravity of the vehicle based on a yaw rate. The driving control apparatus uses a yaw rate F/B value as a yaw rate sensor value.

In the case where the vehicle is driven with the yaw rate F/B value used as the yaw rate sensor value, if the condition of a road surface changes from a high μ condition to a low μ condition, a tire of the vehicle may slip when drive control assumes a high μ road surface. Meanwhile, when the drive control assumes a low μ road surface, the vehicle may not be able to exhibit sufficient turning performance on a high μ road surface. It is therefore conceivable to detect a slipping condition, and change drive control on motors for left and right wheels depending on whether the vehicle is on a high μ road surface or a low μ road surface, and to reduce outputs of the motors when the vehicle is traveling on the low μ road surface.

Suppose that the vehicle is traveling on the low μ road surface, and the outputs of the motors have been reduced to perform control corresponding to the low μ road surface. If control is recovered to control corresponding to a high μ road surface during a process in which the condition of the road surface on which the vehicle is traveling changes from a low μ road surface back to a high μ road surface, the rotation rates of the motors may abruptly increase to cause the vehicle to get into a slipping condition again. If this happens, the slipping condition is detected, and the outputs of the motors are reduced, and accordingly, the control corresponding to the low μ road surface is performed again. Thereafter, during a process in which the condition of the road surface changes from a low μ road surface back to a high μ road surface, the above process is repeated. Thus, the rotation rates of the motors may repeatedly increase and decrease to cause a hunting.

Meanwhile, in order to prevent such a hunting in the motor rotation rates, it is conceivable to prolong a time in which control is recovered to the control corresponding to the high μ road surface for the sake of increased safety in a process in which the condition of the road surface changes from a low μ road surface back to a high μ road surface. This delays a recovery to turn assist control corresponding to the high μ road surface, and may cause a reduction in turning performance of the vehicle.

SUMMARY OF THE INVENTION

It is desirable to provide a novel and improved apparatus and method for controlling a vehicle which are able to securely prevent a hunting in a drive system and allow a quicker recovery to turn assist control corresponding to a high μ road surface when a switch between control for a low μ road surface and control for a high μ road surface is performed.

An aspect of the present invention provides an apparatus for controlling a vehicle, the apparatus including: a vehicle additional yaw moment calculator that calculates, based on a yaw rate of a vehicle, a vehicle additional yaw moment to be applied to the vehicle independently of a steering system; a slipping condition determiner that makes a determination as to a slipping condition of the vehicle; and an adjustment gain calculator that calculates an adjustment gain to adjust the vehicle additional yaw moment so as to reduce the vehicle additional yaw moment when the vehicle is determined to be in the slipping condition, and increases the adjustment gain in accordance with a degree of a slip of the vehicle when the vehicle is determined to recover from the slipping condition.

The apparatus for controlling a vehicle may further include: a theoretical vehicle slip angle calculator that calculates a theoretical vehicle slip angle based on a vehicle model; and an actual vehicle slip angle calculator that calculates an actual vehicle slip angle of the vehicle based on a sensor value. The adjustment gain calculator may increase the adjustment gain based on a difference between the theoretical vehicle slip angle and the actual vehicle slip angle.

The adjustment gain calculator may decrease a rate of the increase in the adjustment gain as the difference between the theoretical vehicle slip angle and the actual vehicle slip angle increases.

In every iteration of a process of calculating the adjustment gain performed in a control cycle, the adjustment gain calculator may add a recovery gain decided based on the difference between the theoretical vehicle slip angle and the actual vehicle slip angle to a last value of the adjustment gain to increase the adjustment gain.

The apparatus for controlling a vehicle may further include: a vehicle slip angle rate calculator that divides the difference between the theoretical vehicle slip angle and the actual vehicle slip angle by the actual vehicle slip angle to calculate a vehicle slip angle rate. The recovery gain may be decided based on the vehicle slip angle rate.

The slipping condition determiner may make the determination as to the slipping condition based on a difference between rotation rates of left and right wheels of the vehicle.

The slipping condition determiner may make the determination as to the slipping condition based on a difference between a theoretical difference between the rotation rates of the left and right wheels calculated from a vehicle model and an actual difference between the rotation rates of the left and right wheels measured from sensors.

The slipping condition determiner may make the determination as to the slipping condition based on a difference between a target yaw rate of the vehicle and a feedback yaw rate for the target yaw rate in addition to the difference between the rotation rates of the left and right wheels.

The apparatus for controlling a vehicle may further include: a target yaw rate calculator that calculates a target yaw rate based on a steering wheel angle and a vehicle speed; a vehicle yaw rate calculator that calculates a yaw rate model value from a vehicle model; a yaw rate sensor that measures an actual yaw rate of the vehicle; and a feedback yaw rate calculator that calculates a feedback yaw rate from the yaw rate model value and the actual yaw rate with distributions of the yaw rate model value and the actual yaw rate based on a difference between the yaw rate model value and the actual yaw rate. The vehicle additional yaw moment calculator may calculate the vehicle additional yaw moment based on a difference between the target yaw rate and the feedback yaw rate.

The apparatus for controlling a vehicle may further include: a required motor torque calculator that calculates required motor torques to individually control motors that drive respective left and right rear wheels of the vehicle based on the vehicle additional yaw moment.

Another aspect of the present invention provides a method for controlling a vehicle, the method including: calculating based on a yaw rate of a vehicle, a vehicle additional yaw moment to be applied to the vehicle independently of a steering system; making a determination as to a slipping condition of the vehicle; calculating an adjustment gain to adjust the vehicle additional yaw moment so as to reduce the vehicle additional yaw moment when the vehicle is determined to be in the slipping condition; and increasing the adjustment gain in accordance with a degree of a slip of the vehicle when the vehicle is determined to recover from the slipping condition.

BRIEF DESCRIPTION OF THE DRAWINGS

FIG. 7 is a schematic diagram illustrating a gain map used when a weighting gain calculator calculates a weighting gain a;

DETAILED DESCRIPTION

Figure 1:
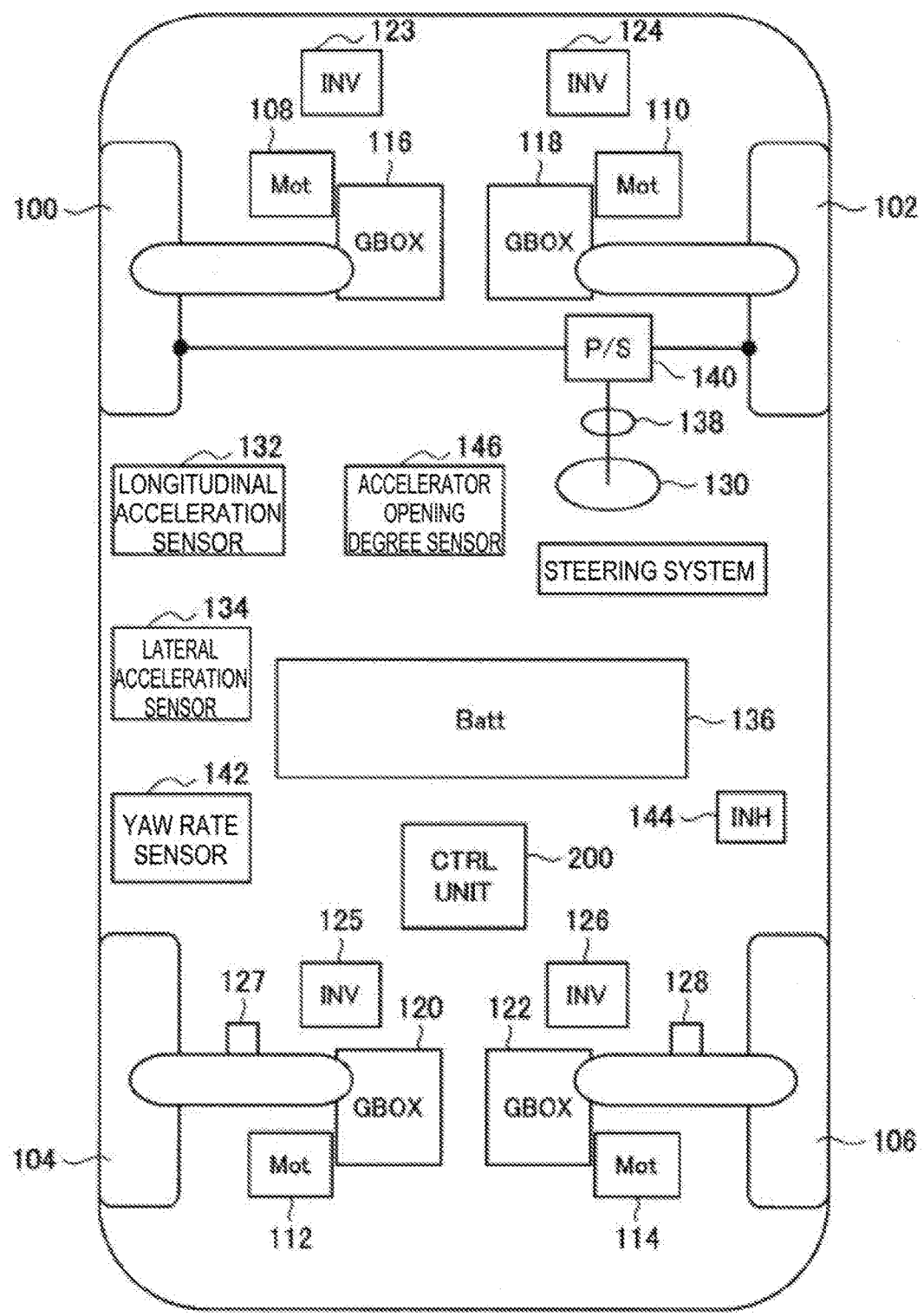
FIG. 1 is a schematic diagram illustrating a vehicle according to an implementation of the present invention.

Hereinafter, preferred implementations of the present invention will be described in detail with reference to the appended drawings. Note that, in this specification and the appended drawings, structural elements that have substantially the same function and structure are denoted with the same reference numerals, and repeated description of these structural elements is omitted.

First, referring to FIG. 1, the structure of a vehicle 1000 according to an implementation of the present invention will be described below. FIG. 1 is a schematic diagram illustrating the vehicle 1000 according to the present implementation. As illustrated in FIG. 1, the vehicle 1000 includes front wheels 100 and 102; rear wheels 104 and 106; driving force generators (i.e., motors) 108, 110, 112, and 114 that drive the front wheels 100 and 102 and the rear wheels 104 and 106, respectively; gearboxes 116, 118, 120, and 122 that transfer driving forces from the motors 108, 110, 112, and 114 to the front wheels 100 and 102 and the rear wheels 104 and 106, respectively; inverters 123, 124, 125, and 126 that control the motors 108, 110, 112, and 114, respectively; wheel speed sensors 127 and 128 that measure the wheel speeds of the respective rear wheels 104 and 106 (i.e., a vehicle speed V); a steering wheel 130 that steers the front wheels 100 and 102; a longitudinal acceleration sensor 132; a lateral acceleration sensor 134; a battery 136; a steering wheel angle sensor 138; a power steering mechanism 140; a yaw rate sensor 142; an inhibitor position sensor (INH) 144; an accelerator opening degree sensor 146; and a control apparatus (i.e., a controller) 200.

The vehicle 1000 according to the present implementation is equipped with the motors 108, 110, 112, and 114 to drive the front wheels 100 and 102 and the rear wheels 104 and 106, respectively. This allows a driving torque for each of the front wheels 100 and 102 and the rear wheels 104 and 106 to be controlled. Therefore, each of the front wheels 100 and 102 and the rear wheels 104 and 106 can be driven to generate a yaw rate through torque vectoring control independently of generation of a yaw rate by steering of the front wheels 100 and 102, and assistance in a steering operation can thus be provided. That is, in the vehicle 1000 according to the present implementation, turn assist control is carried out, that is, assistance in the steering operation is provided by controlling a turning moment (hereinafter referred to also as a yaw moment) based on a vehicle-turning angular velocity (hereinafter referred to as the yaw rate).

Driving of the motors 108, 110, 112, and 114 is controlled by controlling the inverters 123, 124, 125, and 126 corresponding to the motors 108, 110, 112, and 114, respectively, based on instructions from the control apparatus 200. Driving forces by the motors 108, 110, 112, and 114 are transferred to the front wheels 100 and 102 and the rear wheels 104 and 106, respectively, through the respective gearboxes 116, 118, 120, and 122. Each of the motors 108, 110, 112, and 114 and the inverters 123, 124, 125, and 126 used in the vehicle 1000 is highly responsive, and the vehicle 1000 is capable of driving the right and left wheels independently. In the vehicle 1000 as described above, the turning moment (i.e., the yaw moment) can be controlled based on the vehicle-turning angular velocity (i.e., the yaw rate) to carry out the turn assist control, that is, to provide assistance in the steering operation.

The power steering mechanism 140 controls the steering angles of the front wheels 100 and 102 through torque control or angle control in accordance with an operation of the steering wheel 130 by a driver. The steering wheel angle sensor 138 measures a steering wheel angle θh inputted by the driver operating the steering wheel 130. The yaw rate sensor 142 measures an actual yaw rate γ of the vehicle

1000. The wheel speed sensors 127 and 128 measure the vehicle speed V of the vehicle 1000.

Note that the present invention is not limited to the above implementation, and that a vehicle according to another implementation of the present invention may be designed so that only the rear wheels 104 and 106 can generate driving forces independently. Also note that the present invention is not limited to the torque vectoring control with driving force control, and that another implementation of the present invention may be applied to, for example, a four-wheel steering system in which the steering angles of the rear wheels are controlled.

Figure 2:
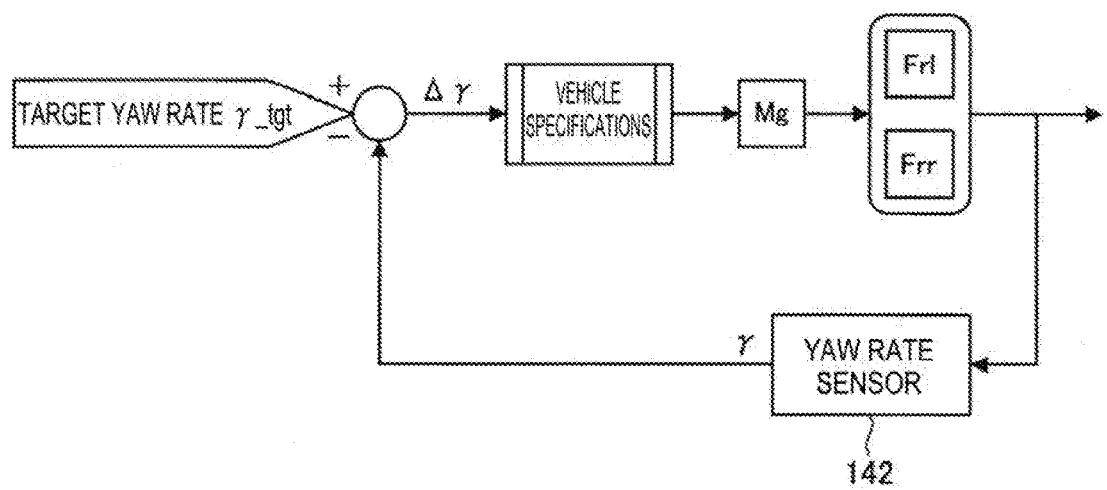
FIG. 2 is a schematic diagram for explaining common yaw rate feedback control.

FIG. 2 is a schematic diagram for explaining common yaw rate feedback control. A target yaw rate $\gamma\_tgt$ is calculated based on the vehicle speed V and the steering wheel angle $\theta h$. Meanwhile, the actual yaw rate $\gamma$ is measured by the yaw rate sensor 142. Then, a difference $\Delta \gamma$ between the target yaw rate $\gamma\_tgt$ and the actual yaw rate $\gamma$ is converted to a vehicle additional yaw moment Mg based on vehicle specifications, and motor torque command values (Frl (the left rear wheel) and Frr (the right rear wheel) for the rear wheels are calculated based on the vehicle additional yaw moment Mg. As described above, the actual yaw rate $\gamma$ is fed back for the target yaw rate $\gamma\_tgt$ to allow the vehicle 1000 to turn in accordance with the target yaw rate $\gamma\_tgt$.

Figure 3:
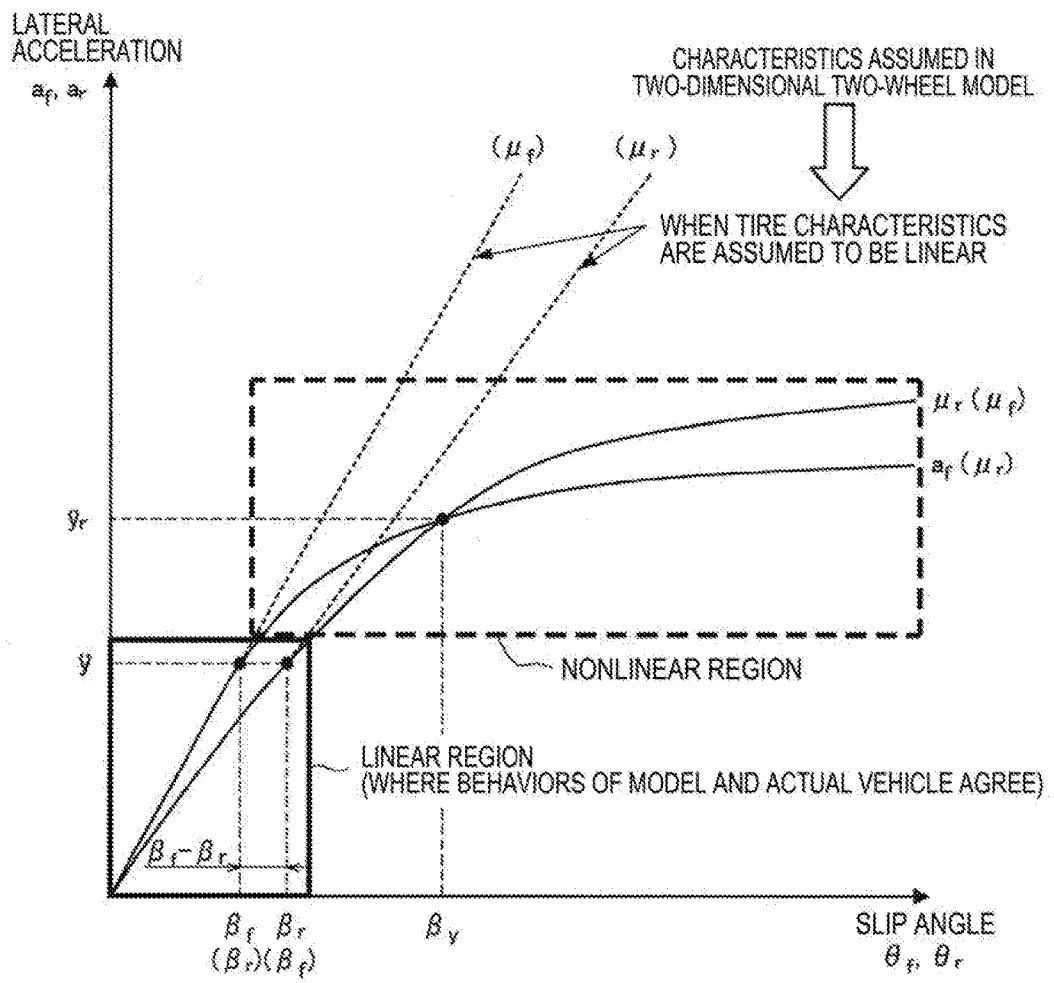
FIG. 3 is a diagram illustrating the relationship between lateral accelerations and slip angles of wheels.

Next, with reference to FIGS. 3, 4, and 5, the action of the turn assist control will now be described in detail below. FIG. 3 is a diagram illustrating the relationship between lateral accelerations and slip angles of the wheels (hereinafter referred to also as the tires).

As illustrated in FIG. 3, characteristics (hereinafter referred to also as cornering characteristics or lateral force characteristics of the tires) that indicate the relationship between the lateral accelerations and slip angles of the tires have a linear region in which the lateral acceleration varies linearly with the slip angle (i.e., a region in which the slip angle is relatively small). In the linear region, the lateral acceleration increases with increasing slip angle. In a two-dimensional two-wheel model, for example, the cornering characteristics of the tires are supposed to be linear, and the behaviors of the model and an actual vehicle substantially agree in the above linear region.

Meanwhile, as the slip angles increase to be relatively large, the cornering characteristics of the tires become nonlinear unlike in the two-dimensional two-wheel model. That is, there is a nonlinear region in which the lateral acceleration varies nonlinearly with the slip angle, and in this nonlinear region, the rate of increase in lateral acceleration is decreased with respect to the rate of increase in slip angle.

As described above, when the slip angle increases to be relatively large, the rate of increase in lateral acceleration obtained is decreased, allowing the lateral acceleration to more easily reach a saturation point. Then, if the lateral acceleration of the front wheels reaches the saturation point, understeer occurs. Accordingly, the turn assist control is applied to the rear wheels of the vehicle to generate, independently of the generation of the yaw moment by the steering of the front wheels, an additional yaw moment acting in the same direction as that of the yaw moment generated by the steering of the front wheels, to produce an additional lateral acceleration to avoid a saturation of the lateral acceleration. As a result, understeer is avoided, and the vehicle is allowed to turn in accordance with the steering.

Figure 4:
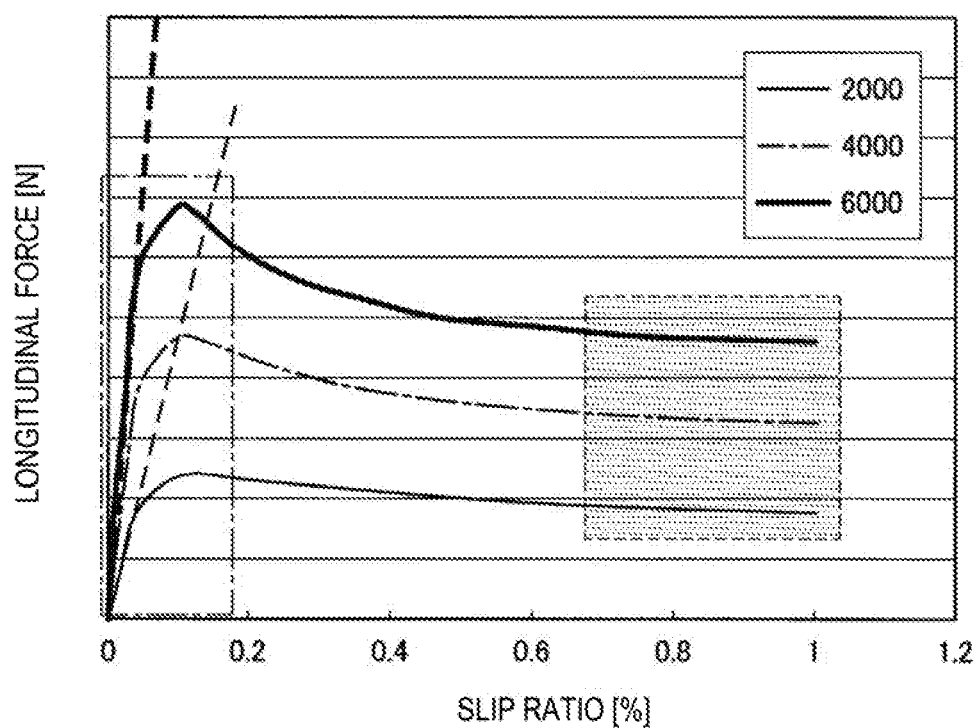
FIG. 4 is a characteristic diagram illustrating the relationship between longitudinal forces and slip ratios of tires.

FIG. 4 is a characteristic diagram illustrating the relationship between longitudinal forces and slip ratios of the tires. In characteristics (hereinafter referred to also as longitudinal force characteristics of the tires) illustrated in FIG. 4, the longitudinal force increases with increasing slip ratio before the slip ratio increases to a certain value. Then, the longitudinal force reaches a saturation point when, for example, the longitudinal force has been increased to an upper limit of a traction circle characteristic of the tire. The slip ratio, which is represented by the horizontal axis in FIG. 4, is generally calculated from Eq. (1) below.

Slip ratio=(vehicle speed−wheel speed)/vehicle speed  (1)

Referring to FIG. 4, once the slip ratio increases to reach a certain value, the longitudinal force begins to decrease. This is because the increase in the slip ratio reduces the traction circle characteristic of the tire, resulting in a reduction in maximum permissible amount of the longitudinal force. If a gain for the turn assist control is increased in this condition, the longitudinal force characteristic of the tire varies so as to approach a region enclosed by a broken line in FIG. 4, that is, the slip ratio increases and the longitudinal force decreases. Conversely, if the gain for the turn assist control is decreased, the longitudinal force characteristic of the tire varies so as to approach a region enclosed by a dot-dashed line in FIG. 4, that is, the slip ratio decreases and the longitudinal force increases. If the gain for the turn assist control is further decreased, the slip ratio decreases and the longitudinal force decreases too.

Here, on a low $\mu$ road surface, which causes the tires to have reduced traction circle characteristics compared to those on a high $\mu$ road surface, the maximum permissible amounts of both the longitudinal force and the lateral force are reduced. If the gain for the turn assist control is increased in this condition, the slip ratio increases, and the traction circle characteristics of the rear tires are further reduced. This further reduces the maximum permissible amount of the lateral force without a sufficient longitudinal force being obtained, making it more likely for the lateral force to reach a saturation point. This may lead to an easy occurrence of oversteer, and may ultimately cause the vehicle to spin.

Accordingly, in the present implementation, the gain for the turn assist control is decreased for a low $\mu$ road surface. If significant deviations between theoretical calculation values and sensor values occur for both wheel rotation rates and the vehicle yaw rate at the time of turn assist, a determination of a slip is made, and an output gain (i.e., a low $\mu$ determination output gain $\mu G$) for the turn assist control is reduced. As a result, the longitudinal forces of the rear wheels 104 and 106 are reduced, resulting in increases in the maximum permissible amounts of the lateral forces. This makes it less likely for the lateral forces of the rear wheels 104 and 106 to reach a saturation point, leading to stabilized behavior of the vehicle 1000 and avoidance of a spin or the like of the vehicle 1000.

Meanwhile, in the present implementation, if the road surface changes from a low $\mu$ surface to a high $\mu$ surface, and it is determined that the deviation between the theoretical value and the actual value of the vehicle yaw rate has become small, a recovery of the value of the gain is carried out to increase the output gain for the turn assist control to ensure a sufficient turning force. If the gain is sharply increased at this time, the rotation rates of the motors for the rear wheels may sharply increase to cause the vehicle 1000 to be in a slipping condition again. More specifically, if a recovery from the slipping condition occurs and the vehicle 1000 is determined to be on a high $\mu$ road surface, the gain is increased to perform a switch to high $\mu$ road surface control, but if a slip occurs again, the gain is reduced again.

If this operation is repeatedly performed, a hunting occurs in the motor rotation rate. One conceivable method increases the gain in a sloping manner with time to avoid the hunting, but this method would take much time to accomplish a recovery when performing the switch to the high μ road surface control.

Accordingly, in the present implementation, when the road surface changes from a low μ surface back to a high μ surface, the output gain for the turn assist control is increased gradually to limit the increase in the motor rotation rate that occurs at the time of a control switch, thus preventing the vehicle 1000 from getting into the slipping condition again. In particular, in the present implementation, in a process in which the vehicle 1000 recovers from the slipping condition, the gain for the turn assist control is increased gradually in accordance with the degree of the slip. A difference between a theoretical calculation value and an actual value of the vehicle slip angle is calculated to determine the rate of recovery, and if the difference is small, which means a small degree of the slip, the rate of recovery is increased, whereas if the difference is large, which means a still large degree of the slip, the rate of recovery is reduced. At this time, a gain map is applied to vary the slope of a control recovery slope in accordance with the degree of the slip. This contributes to preventing a sharp change in the gain and huntings in the motor rotation rate and the tire rotation rate, and to a quick recovery of steering assistance at the time of a turn. This method, in comparison to a method of increasing the gain with time control, maximizes the longitudinal force of the tire transmitted to the road surface, and allows a quicker recovery to the turn assist control, achieving improved drivability.

Thus, the present implementation is able to achieve a combination of superior turning performance and superior stability performance for both low and high μ road surfaces, and is able to minimize the likelihood of a hunting in the motor rotation rate at the time of a control switch. Moreover, the present implementation allows a quick recovery of steering assistance at the time of a turn in response to a recovery from the slipping condition.

Figure 5:
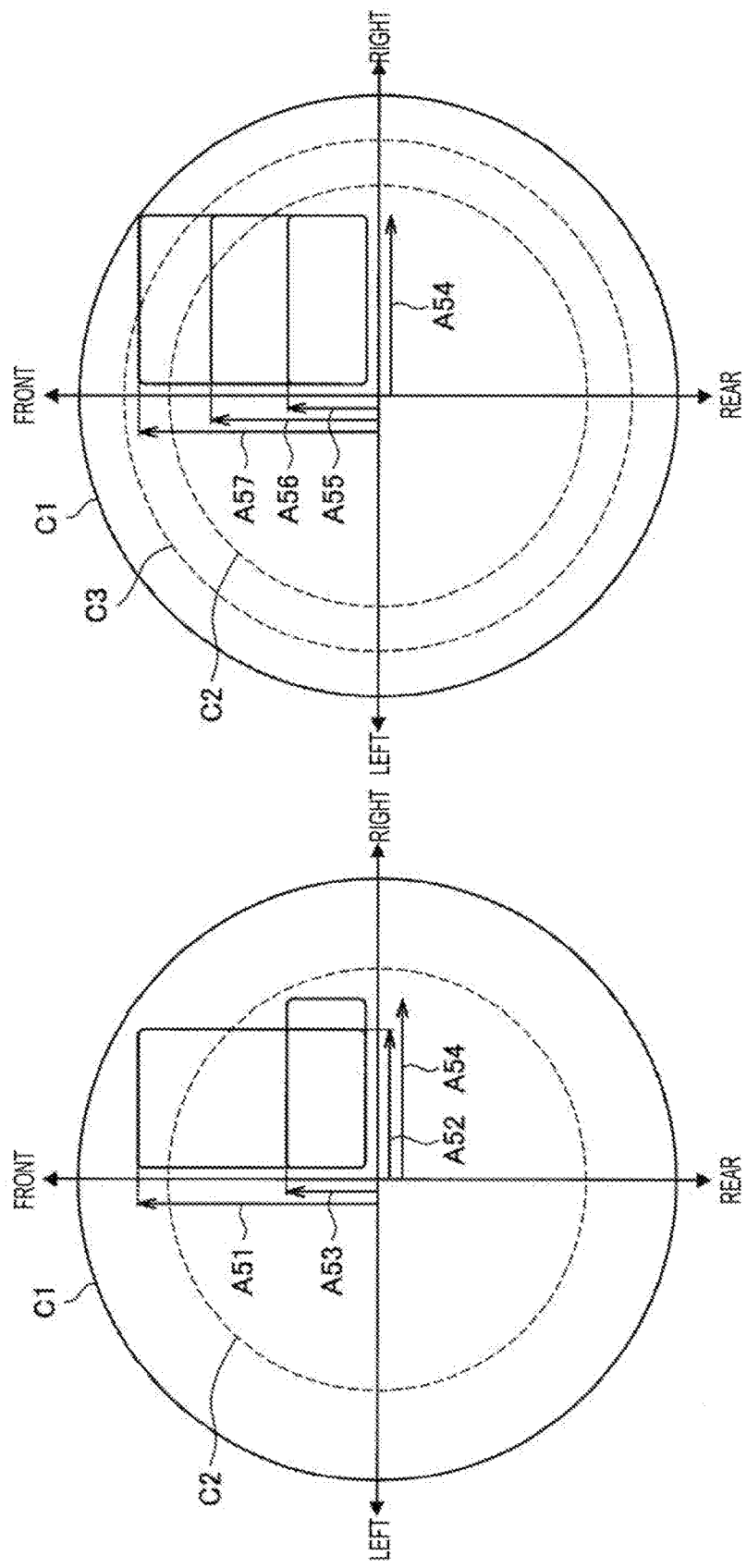
FIG. 5 illustrates the relationship between the longitudinal and lateral forces of a rear wheel.

FIG. 5 illustrates the relationship between the longitudinal and lateral forces of the rear wheel. Stabilization of the behavior of the vehicle 1000 will now be described in detail below with reference to FIG. 5.

Regarding characteristics (hereinafter referred to also as traction circle characteristics of the tire) that indicate the relationship between the longitudinal and lateral forces of each of the rear wheels 104 and 106, when the road surface is in a high μ condition and the gain for the turn assist control has not yet been reduced, for example, the longitudinal force generated is as great as is indicated by arrow A51, which points along the longitudinal axis in the left diagram in FIG. 5, and the length of arrow A52, which points along the lateral axis, corresponds to the maximum permissible amount of the lateral force. When the road surface is in a high μ condition, a large traction circle C1 is drawn as represented by a solid line in the left diagram in FIG. 5, and use of a sufficient amount of the longitudinal force does not allow the lateral force to reach a saturation point. If the road surface changes to a low μ surface in this condition, the traction circle of the tire is reduced to a size as represented by a broken line C2, and the permissible lateral force exceeds the saturation point to cause oversteer. In the present implementation, however, if the road surface changes to a low μ surface, the gain for the turn assist control is reduced, and the longitudinal force decreases as indicated by arrow A53 in the left diagram in FIG. 5, and the maximum permissible amount of the lateral force increases (as indicated by arrow A54). This leads to preventing a lateral slip of each of the rear wheels 104 and 106 and oversteer, allowing the behavior of the vehicle 1000 to become stable.

If the road surface thereafter changes back to a high μ surface, the traction circle C1 of the tire is recovered as illustrated in the right diagram in FIG. 5. Therefore, the gain for the turn assist control can be increased to cause the longitudinal force of the tire to approach the traction circle C1, which is represented by a solid line. At this time, in the present implementation, the gain for the turn assist control is increased in accordance with the degree of the slip of the vehicle 1000. More specifically, as the traction circle increases in size from C2 to C3 and from C3 to C1, the longitudinal force is increased in accordance with the size of the traction circle from an amount indicated by arrow A55 to an amount indicated by arrow A56 and then to an amount indicated by arrow A57. The gain is thus increased with increasing size of the traction circle of the tire, and the longitudinal force can thus be increased in a short time without permitting the longitudinal force to reach a saturation point.

Meanwhile, when the gain is increased with passage of time, increasing the gain needs to be delayed allowing a margin so as not to allow the longitudinal force to reach a saturation point. In this case, a recovery of the gain is delayed, and a reduction in turning performance is incurred until the recovery of the gain.

Accordingly, according to the present implementation, the gain is increased in accordance with the degree of the slip of the vehicle 1000 to facilitate a quicker recovery of the longitudinal force without allowing the longitudinal force to reach the saturation point. This allows a quicker recovery to the turn assist control on the high μ road surface, achieving a significant improvement in the turning performance of the vehicle 1000. A detailed description thereof will now be given below.

Figure 6:
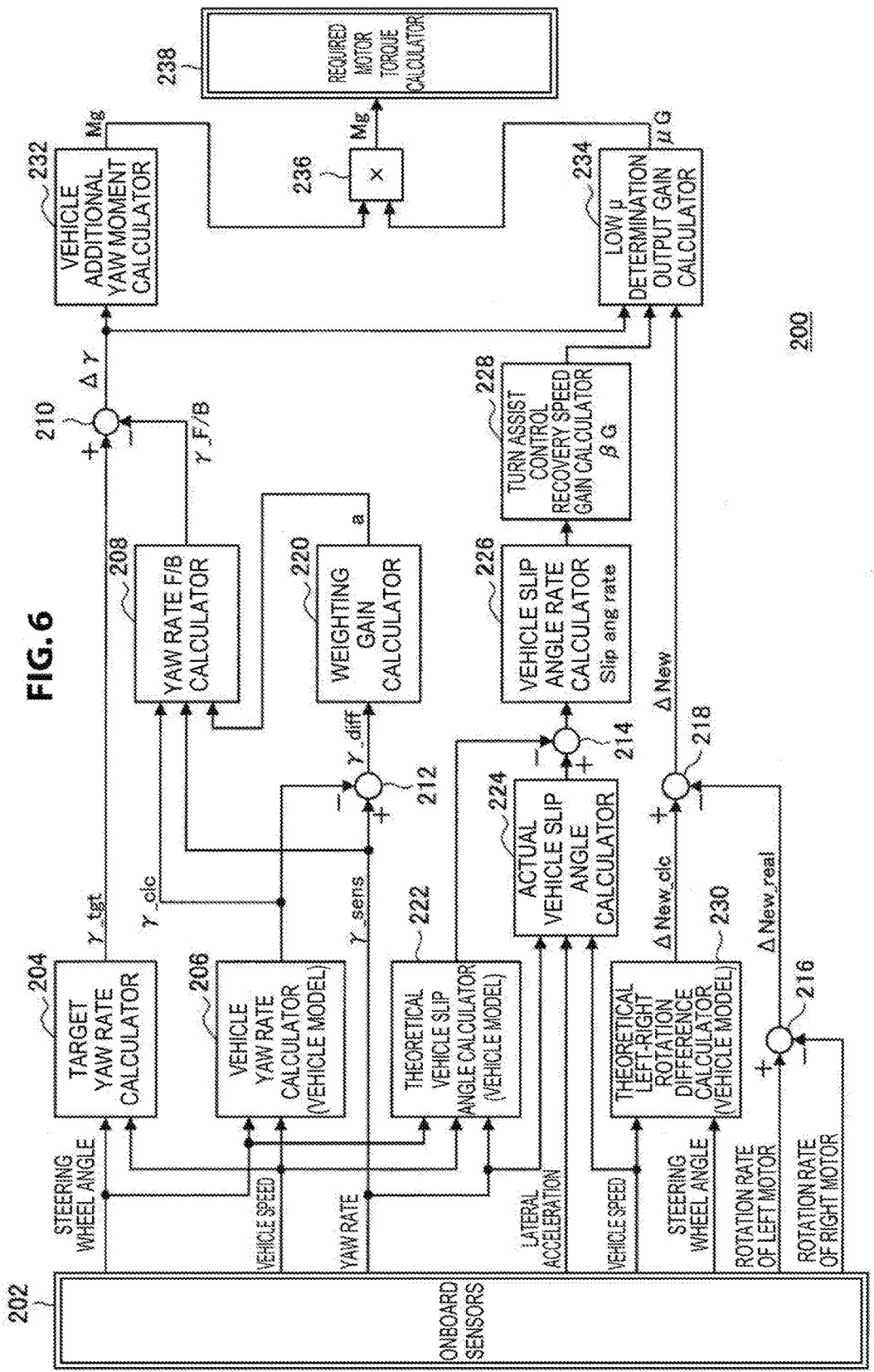
FIG. 6 is a schematic diagram illustrating the structure of a control apparatus and surrounding components according to an implementation of the present invention in detail.

FIG. 6 is a schematic diagram illustrating the structure of the control apparatus 200 and surrounding components according to the present implementation in detail. The control apparatus 200 includes onboard sensors 202, a target yaw rate calculator 204, a vehicle yaw rate calculator (vehicle model) 206, a yaw rate F/B calculator 208, subtractors 210, 212, 214, 216, and 218, a weighting gain calculator 220, a theoretical vehicle slip angle calculator 222, an actual vehicle slip angle calculator 224, a vehicle slip angle rate calculator 226, a turn assist control recovery speed gain calculator 228, a theoretical left-right rotation difference calculator (vehicle model) 230, a vehicle additional yaw moment calculator 232, a low μ determination output gain calculator 234, a multiplier 236, and a required motor torque calculator 238.

In FIG. 6, the onboard sensors 202 include the wheel speed sensors 127 and 128, the longitudinal acceleration sensor 132, the lateral acceleration sensor 134, the steering wheel angle sensor 138, the yaw rate sensor 142, and the accelerator opening degree sensor 146, all of which have been mentioned above. The steering wheel angle sensor 138 measures the steering wheel angle θh of the steering wheel 130. In addition, the yaw rate sensor 142 measures the actual yaw rate γ of the vehicle 1000, and the wheel speed sensors 127 and 128 measure the vehicle speed V. The lateral acceleration sensor 134 measures the lateral acceleration Ay of the vehicle 1000.

The target yaw rate calculator 204 calculates a target yaw rate γ_tgt based on the steering wheel angle θh and the vehicle speed V. More specifically, the target yaw rate calculator 204 calculates the target yaw rate γ_tgt using Eq. (2) below, which represents a common two-dimensional two-wheel model. The target yaw rate γ_tgt is calculated by substituting values calculated from Eqs. (3) and (4) below into the right side of Eq. (2). The calculated target yaw rate γ_tgt is inputted to the subtractor 210.

$$\gamma\_\text{tgt} = \frac{1}{1+TS} \times G_\delta^\gamma(0)_{tgt} \times \frac{\theta h}{N} \qquad (2)$$

$$G_\delta^\gamma(0)_{tgt} = \frac{1}{1+A_{tgt}V^2} \times \frac{V}{l} \qquad (3)$$

$$A_{tgt} = \frac{m}{2l} \times \frac{l_f \times K_{ftgt} + l_r \times K_{rtgt}}{K_{ftgt} \times K_{rtgt}} \qquad (4)$$

Note that the variables, the constants, and the operator in Eqs. (2) to (4) are as follows.

That is, γ_tgt is the target yaw rate, θh is the steering wheel angle, V is the vehicle speed, T is a time constant of the vehicle, S is a Laplace operator, N is a steering gear ratio, l is a vehicle wheelbase, lf is the distance from the center of gravity of the vehicle to a front wheel center, lr is the distance from the center of gravity of the vehicle to a rear wheel center, m is the weight of the vehicle, Kftgt is target cornering power (the front wheels), and Krtgt is target cornering power (the rear wheels).

As shown above, the target yaw rate γ_tgt is calculated from Eq. (2) with the vehicle speed V and the steering wheel angle θh as the variables. The constant Atgt in Eq. (3) is a constant that represents characteristics of the vehicle, and is calculated from Eq. (4).

The vehicle yaw rate calculator 206 calculates a yaw rate model value γ_clc using the following equations for calculating the vehicle yaw rate. More specifically, the yaw rate model value γ_clc (i.e., γ in Eqs. (5) and (6)) is calculated by substituting the vehicle speed V and the steering wheel angle θh into Eqs. (5) and (6) below and solving Eqs. (5) and (6) simultaneously. In Eqs. (5) and (6), Kf represents cornering power (front) and Kr represents cornering power (rear). Note that in Eq. (4), the target cornering powers Kftgt and Krtgt, which are different from the cornering powers Kf and Kr in Eqs. (5) and (6), are used to make the target yaw rate γ_tgt greater than the yaw rate model value γ_clc to enhance the turning performance. The yaw rate model value γ_clc is outputted to the yaw rate F/B calculator 208. In addition, the yaw rate model value γ_clc is inputted to the subtractor 212.

$$2K_f \frac{\theta h}{N} = mV\frac{d}{dt}\beta + 2(K_f + K_r)\beta + \left\{mV + \frac{2}{V}(l_f\ K_f - l_r\ K_r)\right\}\gamma \qquad (5)$$

$$2l_f K_f \frac{\theta h}{N} = 2\ (l_f K_f - l_r K_r)\beta + I\frac{d}{dt}\gamma + \frac{2}{V}(l_f^2 K_f + l_r^2 K_r)\gamma \qquad (6)$$

Meanwhile, the subtractor 212 receives the actual yaw rate γ (hereinafter referred to as an actual yaw rate γ_sens) of the vehicle 1000 measured by the yaw rate sensor 142. The subtractor 212 subtracts the yaw rate model value γ_clc from the actual yaw rate γ_sens to obtain a difference γ_diff between the actual yaw rate γ_sens and the yaw rate model value γ_clc. The difference γ_diff is inputted to the weighting gain calculator 220.

The weighting gain calculator 220 calculates a weighting gain a based on the difference γ_diff between the actual yaw rate γ_sens and the yaw rate model value γ_clc.

The yaw rate F/B calculator 208 receives the yaw rate model value γ_clc, the actual yaw rate γ_sens, and the weighting gain a. The yaw rate F/B calculator 208 weights both the yaw rate model value γ_clc and the actual yaw rate γ_sens using the weighting gain a, and calculates a feedback yaw rate γ_F/B based on Eq. (7) below. The calculated feedback yaw rate γ_F/B is outputted to the subtractor 210.

$$\gamma\_F/B = a \times \gamma\_clc + (1-a) \times \gamma\_sens \qquad (7)$$

Figure 7:
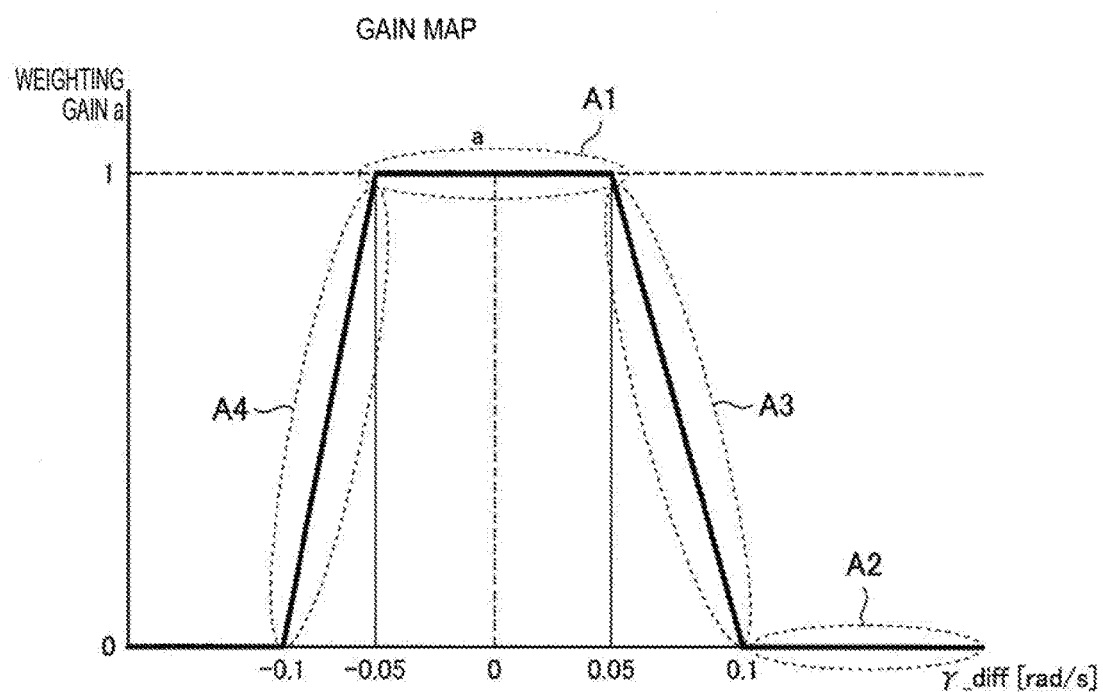

FIG. 7 is a schematic diagram illustrating a gain map used when the weighting gain calculator 220 calculates the weighting gain a. As illustrated in FIG. 7, the value of the weighting gain a varies between 0 and 1 in accordance with the reliability of the vehicle model. The difference (or deviation) γ_diff between the yaw rate model value γ_clc and the actual yaw rate γ_sens is used as an indicator of the reliability of the vehicle model. As illustrated in FIG. 7, the gain map is set such that the value of the weighting gain a will be greater for smaller absolute values of the difference γ_diff. The weighting gain calculator 220 subjects the difference γ_diff to a mapping process of FIG. 7 to compute the weighting gain a in accordance with the reliability of the vehicle model.

In FIG. 7, the weighting gain a can take a value between 0 and 1 (i.e., 0≤a≤1). When −0.05 [rad/s]≤γ_diff≤0.05 [rad/s], the value of the weighting gain a is determined to be 1 (i.e., a=1).

Meanwhile, when 0.1 [rad/s]< γ_diff or γ_diff<−0.1 [rad/s], the value of the weighting gain a is determined to be 0 (i.e., a=0).

Meanwhile, when 0.05 [rad/s]<γ_diff≤0.1 [rad/s], the value of the weighting gain a is calculated using the following equation: a=−20×γ_diff+2.

Meanwhile, when −0.1 [rad/s]≤γ_diff<−0.05 [rad/s], the value of the weighting gain a is calculated using the following equation: a=+20×γ_diff+2.

A region A1 in the gain map illustrated in FIG. 7, which is a region where the difference γ_diff approaches 0, is a region where the S/N ratio of the actual yaw rate γ_sens is low, or a region where tire characteristics exhibit linearity (e.g., when the road surface is dry). Therefore, in the region A1, the yaw rate model value γ_clc calculated by the vehicle yaw rate calculator 206 has a high degree of reliability. Accordingly, the value of the weighting gain a is determined to be 1, and the feedback yaw rate γ_F/B is computed using Eq. (7) with a 100% distribution of the yaw rate model value γ_clc. This eliminates an effect of noise of the yaw rate sensor 142 contained in the actual yaw rate γ_sens, and is thus able to prevent any sensor noise from affecting the feedback yaw rate γ_F/B. This contributes to preventing a vibration of the vehicle 1000, leading to improved ride comfort.

Here, the difference between the actual yaw rate γ and the yaw rate model value γ_clc calculated from the vehicle model is caused by, for example, dynamic characteristics of the tires as illustrated in FIG. 3. The aforementioned two-dimensional two-wheel model assumes a region where the relationship (i.e., the cornering characteristics of the tires) between the lateral accelerations and slip angles of the tires exhibits linearity, and in this linear region, the actual yaw rate γ and the yaw rate model value γ_clc substantially agree with each other. In the characteristics that indicate the relationship between the lateral accelerations and the slip angles as illustrated in FIG. 3, an effect of sensor noise of the yaw rate sensor 142 occurs in the linear region where the lateral acceleration varies linearly with the slip angle (i.e., a region where the speed at which the steering wheel is turned is relatively low). Accordingly, the yaw rate model value γ_clc is used in this region.

Meanwhile, in the region where the cornering characteristics of the tires exhibit nonlinearity, the yaw rate and the lateral acceleration of the actual vehicle vary nonlinearly with the steering angle or the slip angle, and a significant difference occurs between the yaw rate measured on the actual vehicle and the yaw rate of the two-dimensional two-wheel model. In such a transient nonlinear region, noise does not occur on account of the sensor characteristics of the yaw rate sensor 142, and the actual yaw rate γ can therefore be used. Such a nonlinear region corresponds to, for example, a time at which the steering wheel is turned back. A case where the actual yaw rate γ exceeds the yaw rate model value γ_clc corresponds to the nonlinear region, and in this case, no sensor noise produces an effect, and the actual yaw rate γ can therefore be used to allow control based on the true value. Note that, while use of a model that allows for nonlinearity of the tires complicates the control based on the yaw rate, the reliability of the yaw rate model value γ_clc can be easily estimated based on the difference γ_diff, and the actual yaw rate γ can be used with a greater distribution in the nonlinear region in the present implementation. Moreover, in a region where the dynamic characteristics of the tires can produce no or limited influence, only the yaw rate model value γ_clc may be used.

Further, a region A2 in the gain map illustrated in FIG. 7, which is a region where the difference γ_diff has a large value, corresponds to, for example, a time when the vehicle is traveling on a wet road surface, a time when the vehicle is traveling on a snow-covered road, or a time when the vehicle is making a sharp turn, and is a marginal region in which the tires are sliding. In this region, the yaw rate model value γ_clc calculated by the vehicle yaw rate calculator 206 has a low degree of reliability, and the difference γ_diff has a greater value. Accordingly, the value of the weighting gain a is determined to be 0, and the feedback yaw rate γ_F/B is computed using Eq. (7) with a 100% distribution of the actual yaw rate γ_sens. This contributes to ensuring sufficient precision of the feedback based on the actual yaw rate γ_sens, allowing feedback control of the yaw rate reflecting the behavior of the actual vehicle. A turn of the vehicle 1000 can thus be optimally controlled based on the actual yaw rate γ_sens. Moreover, in the region in which the tires are sliding, noise in a signal obtained by the yaw rate sensor 142 would not cause a vibration of the vehicle 1000 that can be perceived by the driver, and would not cause a significant reduction in ride comfort. The low μ region A2 illustrated in FIG. 7, for which the value of the weighting gain a is determined to be 0, may be set based on design requirements, or may be experimentally determined based on steering stability performance, ride comfort, and so on when the vehicle 1000 actually travels on a low μ road surface.

Furthermore, in a region A3 in the gain map illustrated in FIG. 7, which is a transitional region (a nonlinear region) from the linear region to the marginal region, the distributions of the yaw rate model value γ_clc and the actual yaw rate γ_sens (i.e., the value of the weighting gain a) are linearly varied while taking into account the tire characteristics of the actual vehicle 1000 as necessary. In the transitional region from the region A1 (i.e., a high μ region) to the region A2 (i.e., a low μ region), or from the region A2 (i.e., the low μ region) to the region A1 (i.e., the high μ region), the weighting gain a is computed using linear interpolation to avoid a torque change and a yaw rate change caused by an abrupt change in the weighting gain a.

Furthermore, a region A4 in the gain map illustrated in FIG. 7 corresponds to a case where the actual yaw rate γ_sens is greater than the yaw rate model value γ_clc. In the case where an incorrect parameter is inputted to the vehicle yaw rate calculator 206, and the yaw rate model value γ_clc is calculated incorrectly, for example, the actual yaw rate γ_sens can be used based on a map of the region A4 to perform control. Note that the range of the weighting gain a is not limited to the range of 0 to 1, and that any range of the weighting gain a that allows vehicle control may be adopted in other implementations of the present invention without departing from the scope of the present invention.

The subtractor 210 subtracts the feedback yaw rate γ_F/B from the target yaw rate γ_tgt, which is an input from the target yaw rate calculator 204, to obtain a difference Δγ between the target yaw rate γ_tgt and the feedback yaw rate γ_F/B. That is, the difference Δγ is calculated from Eq. (8) below.

$$\Delta\gamma = \gamma\_tgt - \gamma\_F/B \quad (8)$$

The difference Δγ is inputted, as an amount of yaw rate correction, to the vehicle additional yaw moment calculator 232. In addition, the difference Δγ is inputted to the low μ determination output gain calculator 234.

The vehicle additional yaw moment calculator 232 computes the vehicle additional yaw moment Mg based on the inputted difference Δγ so that the difference Δγ will become 0, that is, so that the target yaw rate γ_tgt will agree with the feedback yaw rate γ_F/B. More specifically, the vehicle additional yaw moment Mg is calculated from Eq. (9) below. The vehicle additional yaw moment Mg thus calculated is an additional yaw moment that needs to be applied to a center of the vehicle 1000 to accomplish an intended turn. A turning moment based on the vehicle additional yaw moment Mg is additionally applied to the vehicle 1000.

$$Mg = \frac{d}{dt}\Delta\gamma \times Iz + \Delta\gamma \times \{2(l_f^2 K_f + l_r^2 K_r)/V\} \quad (9)$$

When a deviation of an actual value of a difference between the rotation rates of the left and right rear wheels 104 and 106 from a theoretical value of the difference therebetween is equal to or smaller than a set threshold value, and a deviation of the feedback yaw rate γ_F/B from the target yaw rate γ_tgt is equal to or smaller than a set threshold value, the control apparatus 200 determines that the vehicle 1000 has recovered from the slipping condition, and recovers the output gain for the turn assist control. The theoretical vehicle slip angle calculator 222, the actual vehicle slip angle calculator 224, the vehicle slip angle rate calculator 226, the turn assist control recovery speed gain calculator 228, and the low μ determination output gain calculator 234 perform a process for recovering the output gain.

The theoretical vehicle slip angle calculator 222 calculates a theoretical vehicle slip angle Slip_ang_clc based on Eqs. (5) and (6), which represent a two-dimensional two-wheel model. The theoretical vehicle slip angle Slip_ang_clc corresponds to β in Eqs. (5) and (6). The theoretical vehicle slip angle calculator 222 calculates the theoretical vehicle slip angle Slip_ang_clc based on the steering wheel angle θh, the vehicle speed V, and the actual yaw rate γ_sens. The calculated theoretical vehicle slip angle Slip_ang_clc is inputted to the subtractor 214.

The actual vehicle slip angle calculator 224 calculates an actual vehicle slip angle Slip_ang_real based on the actual yaw rate γ_sens, the lateral acceleration Ay, and the vehicle speed V. More specifically, the actual vehicle slip angle calculator 224 calculates the actual vehicle slip angle Slip_ang_real from Eq. (10) below. Note that a measured value obtained by the lateral acceleration sensor 134 is used as the lateral acceleration Ay. The calculated actual vehicle slip angle Slip_ang_real is inputted to the subtractor 214.

$$\text{Slip\_ang\_real} = d(Ay/V - \gamma\_sens)/dt \tag{10}$$

The subtractor 214 calculates a difference ΔSlip_ang between the actual vehicle slip angle Slip_ang_real and the theoretical vehicle slip angle Slip_ang_clc. More specifically, the subtractor 214 subtracts an absolute value of the theoretical vehicle slip angle Slip_ang_clc from an absolute value of the actual vehicle slip angle Slip_ang_real to obtain the difference ΔSlip_ang. That is, the difference ΔSlip_ang is calculated from Eq. (11) below. The calculated difference ΔSlip_ang is inputted to the vehicle slip angle rate calculator 226.

$$\Delta\text{Slip\_ang} = |\text{Slip\_ang\_real}| - |\text{Slip\_ang\_clc}| \tag{11}$$

The vehicle slip angle rate calculator 226 divides an absolute value of the difference ΔSlip_ang by the absolute value of the actual vehicle slip angle Slip_ang_real to calculate a vehicle slip angle rate Slip_ang_rate. That is, the vehicle slip angle rate Slip_ang_rate is calculated from Eq. (12) below. The calculated vehicle slip angle rate Slip_ang_rate is inputted to the turn assist control recovery speed gain calculator 228.

$$\text{Slip\_ang\_rate} = |\Delta\text{Slip\_ang}|/|\text{Slip\_ang\_real}| \tag{12}$$

The turn assist control recovery speed gain calculator 228 calculates a turn assist control recovery speed gain βG based on the vehicle slip angle rate Slip_ang_rate. The turn assist control recovery speed gain calculator 228 calculates the turn assist control recovery speed gain βG to vary the speed of recovery of the low μ determination output gain μG based on the difference between the theoretical value and sensor value of the vehicle slip angle. The turn assist control recovery speed gain βG is calculated from Eq. (13) below. The turn assist control recovery speed gain βG is inputted to the low μ determination output gain calculator 234.

$$\beta G = 1 - \text{Slip\_ang\_rate} \tag{13}$$

Meanwhile, the control apparatus 200 compares the actual value of the difference between the rotation rates of the left and right rear wheels 104 and 106 with the theoretical value of the difference therebetween, and, if the actual value significantly deviates from the theoretical value and the feedback yaw rate γ_F/B significantly deviates from the target yaw rate γ_tgt, determines that the vehicle is in the slipping condition and reduces assist torque to be applied to the rear wheels 104 and 106. Accordingly, the theoretical left-right rotation difference calculator 230 calculates a theoretical left-right rotation difference value ΔNew_clc based on the vehicle speed V and the steering wheel angle θh. The theoretical left-right rotation difference value ΔNew_clc represents a difference between the rotation rates of the left and right rear wheels 104 and 106, and this difference can be geometrically determined in accordance with the turning radii of the left and right rear wheels 104 and 106. In addition, the subtractor 216 calculates an actual left-right rotation difference value ΔNew_real, which represents a difference between the rotation rate of the left rear wheel 104 and the rotation rate of the right rear wheel 106. Note that the actual left-right rotation difference value ΔNew_real can be obtained from a difference between the rotation rates measured by the left and right wheel speed sensors 127 and 128. Also note that the actual left-right rotation difference value ΔNew_real may alternatively be determined based on a difference between the rotation rates of the left and right front wheels 100 and 102.

The subtractor 218 receives the theoretical left-right rotation difference value ΔNew_clc and the actual left-right rotation difference value ΔNew_real. The subtractor 218 subtracts the actual left-right rotation difference value ΔNew_real from the theoretical left-right rotation difference value ΔNew_clc to calculate a difference ΔNew therebetween. That is, the difference ΔNew is calculated from Eq. (14) below. The difference ΔNew is inputted to the low μ determination output gain calculator 234.

$$\Delta\text{New} = \Delta\text{New}\_clc - \Delta\text{New\_real} \tag{14}$$

The low μ determination output gain calculator 234 makes a determination as to a slip determination flag μjud and calculates the low μ determination output gain μG based on the differences ΔNew and Δγ. More specifically, the low μ determination output gain calculator 234 compares the difference ΔNew with a corresponding threshold value and the difference Δγ with a corresponding threshold value to make a determination as to the slip determination flag μjud for the vehicle 1000. Details thereof will be described below with reference to a flowchart illustrated in FIG. 12. If the difference ΔNew alone were used when making a determination as to a slip, it might be erroneously determined that the vehicle 1000 is in the slipping condition when, for example, the vehicle 1000 has gone over a shoulder or the like to cause the difference ΔNew to temporarily exceed the threshold value. In addition, if the determination as to a slip were performed based on the difference Δγ alone, a delay in a determination as to the slipping condition might occur due to a delay in response of the difference Δγ. Use of both the difference ΔNew and the difference Δγ to make a determination as to a slip increases precision in making a determination as to the slipping condition. Note that, in the present implementation, a "slipping condition determiner" that makes a determination as to the slipping condition of the vehicle 1000 is made up of the theoretical left-right rotation difference calculator 230, the subtractor 218, and the low μ determination output gain calculator 234.

In addition, the low μ determination output gain calculator 234 calculates the low μ determination output gain μG based on the differences ΔNew and Δγ and the slip determination flag μjud. Here, the low μ determination output gain μG, which is used for control, has a maximum value of 1, and the value of the low μ determination output gain μG is set to 1 when the road surface is in a high μ condition (i.e., when μjud=0).

Meanwhile, when the vehicle 1000 is determined to be liable to slip (i.e., when μjud=1), the low μ determination output gain calculator 234 reduces the value of the low μ determination output gain μG so as to reduce the vehicle additional yaw moment. In the present implementation, when the vehicle 1000 is determined to be liable to slip (i.e., when μjud=1), the value of the low μ determination output gain μG is reduced to 0.1, for example.

If the condition of the road surface thereafter changes from a low μ condition to a high μ condition, and the tendency of the vehicle 1000 to slip is accordingly reduced, the low μ determination output gain calculator 234 varies the low μ determination output gain μG so as to increase the vehicle additional yaw moment once reduced. At this time, the low μ determination output gain calculator 234 varies the low μ determination output gain μG in accordance with the degree of the slip of the vehicle 1000 such that the value of the low μ determination output gain μG is closer to 1 as the tendency of the vehicle 1000 to slip decreases. More specifically, based on Eq. (15) below, the low μ determination output gain calculator 234 adds the turn assist control recovery speed gain βG to a last value μG' of the low μ determination output gain μG to calculate the low μ determination output gain μG.

$$\mu G = \mu G' + \beta G \qquad (15)$$

In Eq. (15), the turn assist control recovery speed gain βG is a value obtained from the vehicle slip angle rate Slip_ang_rate. The vehicle slip angle rate Slip_ang_rate is calculated from the difference ΔSlip_ang between the actual vehicle slip angle Slip_ang_real and the theoretical vehicle slip angle Slip_ang_clc, and the value of ΔSlip_ang decreases as the tendency of the vehicle 1000 to slip decreases. That is, when the road surface is in a high μ condition, and the tendency of the vehicle 1000 to slip is slight, the value of the actual vehicle slip angle Slip_ang_real, which has been obtained from the sensor values, is close to the calculated theoretical vehicle slip angle Slip_ang_clc. Conversely, when the road surface is in a low μ condition, and the tendency of the vehicle 1000 to slip is large, the value of the actual vehicle slip angle Slip_ang_real, which has been obtained from the sensor values, significantly deviates from the calculated theoretical vehicle slip angle Slip_ang_clc. Accordingly, based on Eq. (13), as the tendency of the vehicle 1000 to slip decreases, the value of the turn assist control recovery speed gain βG increases, resulting in a greater value of the low μ determination output gain μG. The recovery of the low μ determination output gain μG thus varies depending on the difference ΔSlip_ang between the theoretical and actual values of the vehicle slip angle. As a result, as the tendency of the vehicle 1000 to slip decreases, the speed at which the value of the low μ determination output gain μG is recovered to or toward 1 increases.

The multiplier 236 receives the low μ determination output gain μG calculated by the low μ determination output gain calculator 234. The multiplier 236 also receives the vehicle additional yaw moment Mg calculated by the vehicle additional yaw moment calculator 232. The multiplier 236 multiplies the vehicle additional yaw moment Mg by the low μ determination output gain μG to calculate a corrected value Mg' of the vehicle additional yaw moment Mg. If, for example, the vehicle 1000 is determined to be liable to slip (i.e., μjud=1), and the low μ determination output gain calculator 234 determines that a low μ condition exists, the value of the low μ determination output gain μG is set to 0.1, and the vehicle additional yaw moment Mg is accordingly corrected to a value 1/10 times that of the vehicle additional yaw moment Mg.

The corrected value Mg' is inputted to the required motor torque calculator 238. The required motor torque calculator 238 converts moment to torque using the corrected value Mg', and calculates ΔTv from Eq. (16) below. Then, the required motor torque calculator 238 calculates additional torque Tvmot from Eq. (17) below.

$$\Delta Tv = \mu G \times \frac{Mg'}{TrdR/2} \times TireR \times \frac{1}{Gratio} \qquad (16)$$

$$Tvmot = \frac{\Delta Tv}{2} \qquad (17)$$

In Eq. (16), TrdR denotes a tread width of the rear wheels 104 and 106. In addition, TireR denotes a tire radius of the front wheels 100 and 102 and the rear wheels 104 and 106, and Gratio denotes a gear ratio of the gearboxes 120 and 122 of the rear wheels 104 and 106. Based on Eq. (16), the corrected value Mg' of the vehicle additional yaw moment Mg, which is to be applied to the center of the vehicle 1000, is converted to motor torque ΔTv for the rear wheels 104 and 106. Then, motor torque needed for each of the rear wheels 104 and 106 to produce the corrected value Mg' is calculated from Eq. (17).

When the vehicle 1000 travels straight ahead, driving forces for the front wheels 100 and 102 and the rear wheels 104 and 106 are determined by a motor torque command value reqTq determined from a requested driving force inputted by the driver (i.e., the degree of opening of an accelerator pedal). Here, the motor torque command value reqTq is calculated from Eq. (18) below.

$$reqTq = reqF * TireR * Gratio \qquad (18)$$

In Eq. (18), reqF is the requested driving force determined from the degree of opening of the accelerator pedal. The degree of opening of the accelerator pedal is measured by the accelerator opening degree sensor 146.

When the vehicle 1000 travels straight ahead, the driving force of each of the four motors 108, 110, 112, and 114, which drive the front wheels 100 and 102 and the rear wheels 104 and 106, respectively, is a quarter (=reqTq/4) of the motor torque command value reqTq based on the requested driving force reqF inputted by the driver. Meanwhile, when the vehicle 1000 makes a turn, torque vectoring control is performed, so that the additional torque Tvmot based on the vehicle additional yaw moment Mg' calculated from Eq. (17) is added to the motor torque command value, reqTq/4, for each of the rear wheels 104 and 106. The additional torque Tvmot based on the vehicle additional yaw moment Mg' forms a couple, and therefore, when the vehicle 1000 turns to the right, the motor torque command value for the left rear wheel 104 is a value obtained by adding the additional torque Tvmot to the motor torque command value, reqTq/4, for the straight-ahead travel, and the motor torque command value for the right rear wheel 106 is a value obtained by subtracting the additional torque Tvmot from the motor torque command value, reqTq/4, for the straight-ahead travel. Similarly, when the vehicle 1000 turns to the left, the motor torque command value for the right rear wheel 106 is a value obtained by adding the additional torque Tvmot to the motor torque command value, reqTq/4, for the straight-ahead travel, and the motor torque command value for the left rear wheel 104 is a value obtained by subtracting the additional torque Tvmot from the motor torque command value, reqTq/4, for the straight-ahead travel.

Therefore, the motor torque command values for the respective motors 108, 110, 112, and 114 when the vehicle 1000 makes a turn are expressed by Eqs. (19), (20), (21), and (22) below, respectively. The required motor torque calculator 238 calculates motor torque command values TqmotFl, TqmotFr, TqmotRl, and TqmotRr for the respective motors 108, 110, 112, and 114 based on Eqs. (19) to (22).

$$TqmotFl \text{(the motor torque command value for the left front wheel)} = reqTq/4 \qquad (19)$$

$$TqmotFr \text{(the motor torque command value for the right front wheel)} = reqTq/4 \qquad (20)$$

$$TqmotRl \text{(the motor torque command value for the left rear wheel)} = reqTq/4 - (\pm Tvmot) \qquad (21)$$

$$TqmotRr \text{(the motor torque command value for the right rear wheel)} = reqTq/4 + (\pm Tvmot) \qquad (22)$$

Note that the sign of the additional torque Tvmot is set in accordance with the direction of the turn.

Figure 8:
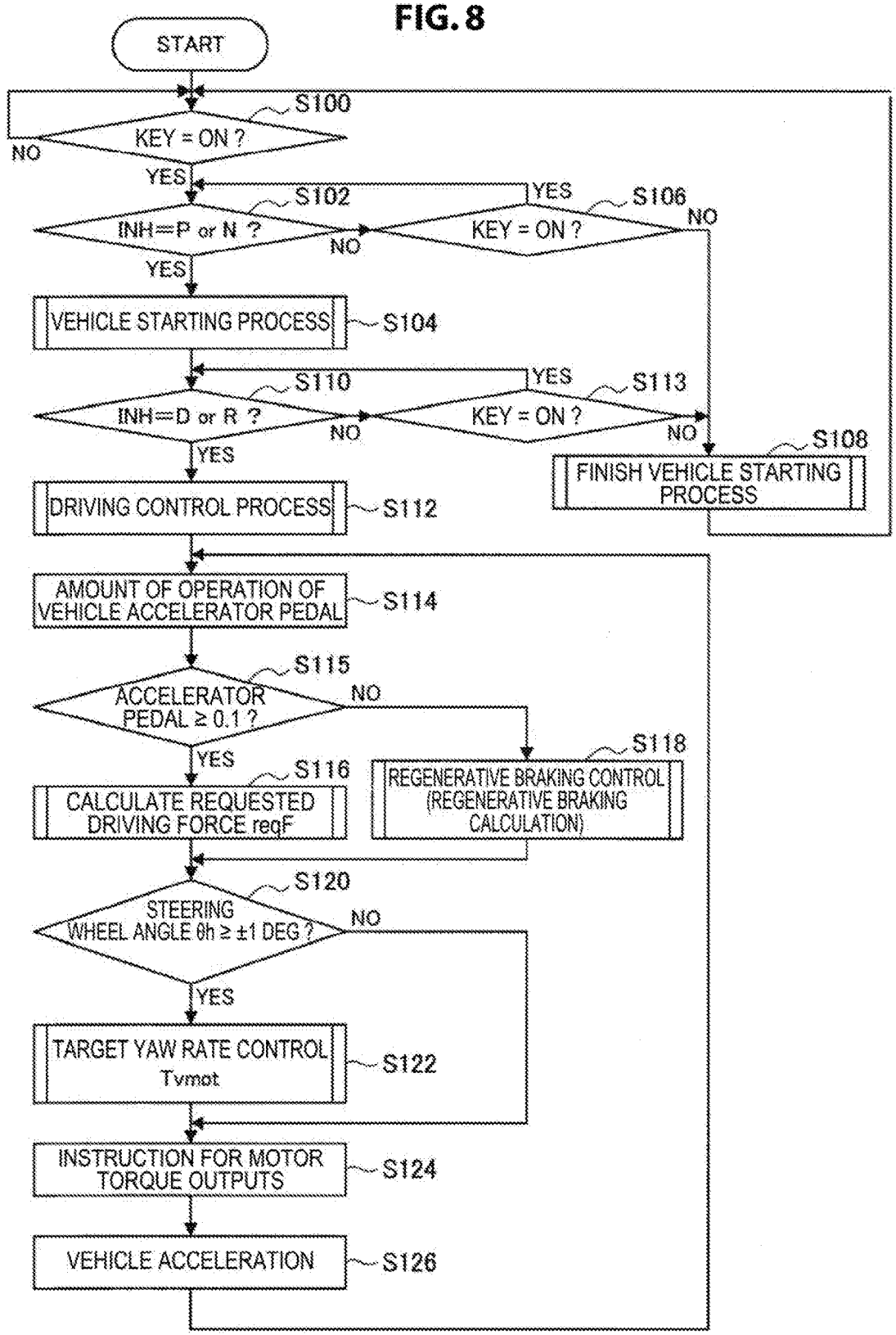
FIG. 8 is a flowchart illustrating overall processing according to an implementation of the present invention.

Next, processing performed by the control apparatus 200 according to the present implementation will now be described below. FIG. 8 is a flowchart illustrating overall processing according to the present implementation. First, at step S100, it is determined whether an ignition key (i.e., an ignition SW) is in an ON position. If it is determined that the ignition key is in the ON position, control proceeds to step S102, whereas control waits at step S100 while the ignition key is not in the ON position.

At step S102, it is determined whether or not the inhibitor position sensor (INH) 144 indicates a P (parking) or N (neutral) position. If it is determined at step S102 that the inhibitor position sensor (INH) 144 indicates the P (parking) or N (neutral) position, control proceeds to step S104. Meanwhile, if it is determined at step S102 that the inhibitor position sensor (INH) 144 does not indicate the P (parking) or N (neutral) position, control proceeds to step S106. At step S106, it is determined whether the ignition key is in the ON position, and if it is determined that the ignition key is in the ON position, control returns to step S102. If it is determined at step S106 that the ignition key is in an OFF position, control proceeds to step S108, and a process of starting the vehicle 1000 is finished, and control returns to step S100.

At step S104, the process of starting the vehicle 1000 is performed, and at next step S110, it is determined whether or not the inhibitor position sensor (INH) 144 indicates a D (drive) or R (reverse) position. Then, if it is determined that the inhibitor position sensor (INH) 144 indicates the D (drive) or R (reverse) position, control proceeds to step S112, and a driving control process is started. Meanwhile, if it is determined at step S110 that the inhibitor position sensor (INH) 144 does not indicate the D (drive) or R (reverse) position, control proceeds to step S113. At step S113, it is determined whether the ignition key is in the ON position, and if it is determined that the ignition key is in the ON position, control returns to step S110. If it is determined at step S113 that the ignition key is in the OFF position, control proceeds to step S108, and the process of starting the vehicle 1000 is finished, and control returns to step S100.

After step S112, control proceeds to step S114, and the amount (i.e., an accelerator opening degree) of an operation of the accelerator pedal by the driver is detected from a measured value of the accelerator opening degree sensor 146. At next step S115, it is determined whether or not the amount of the operation of the accelerator pedal is 0.1 or more, and if it is determined that the amount of the operation of the accelerator pedal is 0.1 or more, control proceeds to step S116. At step S116, the requested driving force reqF is calculated based on the amount of the operation of the accelerator pedal. Note that the calculation of the requested driving force reqF may be performed based on, for example, a map that defines the relationship between the accelerator opening degree and the requested driving force reqF. Meanwhile, if it is determined at step S115 that the amount of the operation of the accelerator pedal is less than 0.1, control proceeds to step S118, and regenerative braking control is performed on each of the motors 108, 110, 112, and 114.

After steps S116 and S118, control proceeds to step S120. At step S120, it is determined whether or not an absolute value of the steering wheel angle θh measured by the steering wheel angle sensor 138 is 1 [deg] or more, and if it is determined that the absolute value of the steering wheel angle θh is 1 [deg] or more, control proceeds to step S122. At step S122, the additional torque Tvmot is calculated by the above-described method, and feedback control for the target yaw rate γ_tgt is performed based on the additional torque Tvmot. Accordingly, at next step S124, the motor torque command values for the respective motors 108, 110, 112, and 114 are calculated from Eqs. (19) to (22) based on the additional torque Tvmot, and each of the motors 108, 110, 112, and 114 is instructed to produce a desired output. At next step S126, an acceleration of the vehicle 1000 is measured by the longitudinal acceleration sensor 132 and the lateral acceleration sensor 134. After step S126, control returns to step S114.

Figure 9:
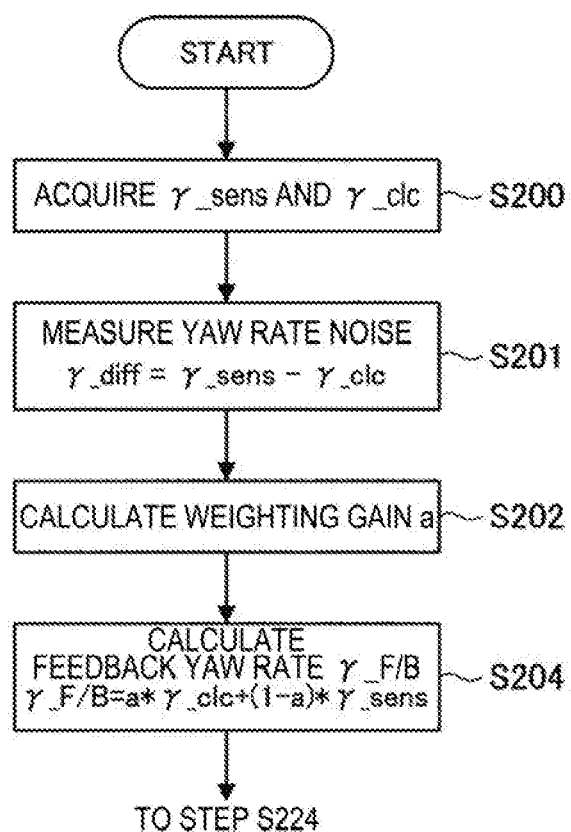
FIG. 9 is a flowchart illustrating a process at step S122 in FIG. 8.

Next, primary processes included in the processing illustrated in FIG. 8 will now be described in detail below. FIG. 9 is a flowchart illustrating the process at step S122 in FIG. 8. Here, FIG. 9 is a flowchart illustrating a process in which the weighting gain calculator 220 calculates the weighting gain a. The process of FIG. 9 serves as a process of removing noise of the yaw rate sensor 142, by calculating the feedback yaw rate γ_F/B with distributions of the actual yaw rate γ_sens and the yaw rate model value γ_clc based on the weighting gain a. First, at step S200, the actual yaw rate γ_sens and the yaw rate model value γ_clc are acquired. At next step S201, the difference γ_diff between the actual yaw rate γ_sens and the yaw rate model value γ_clc is calculated. At next step S202, the weighting gain a is calculated based on the gain map as illustrated in FIG. 7. At next step S204, the feedback yaw rate γ_F/B is calculated based on Eq. (7) mentioned above. The calculated feedback yaw rate γ_F/B is used to calculate the difference Δγ at step S224 in FIG. 11.

Figure 10:
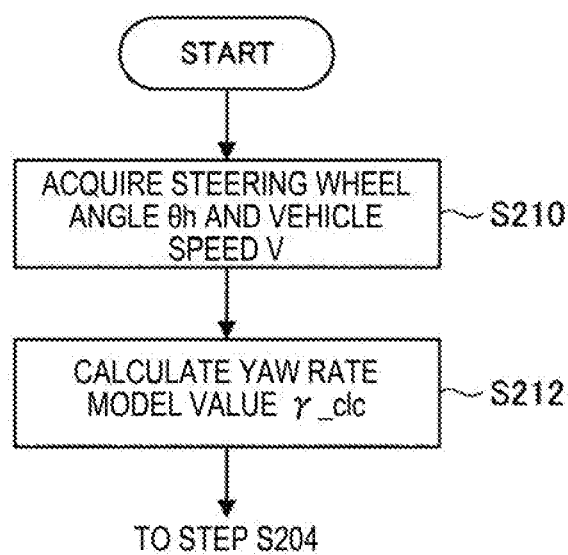
FIG. 10 is a flowchart illustrating a process in which a vehicle yaw rate calculator calculates a yaw rate model value γ_clc.

FIG. 10 is a flowchart illustrating a process in which the vehicle yaw rate calculator 206 calculates the yaw rate model value γ_clc. First, at step S210, the steering wheel angle θh and the vehicle speed V are acquired. At next step S212, Eqs. (5) and (6) are solved simultaneously to calculate the yaw rate model value γ_clc. The calculated yaw rate model value γ_clc is used to calculate the feedback yaw rate γ_F/B at step S204 in FIG. 9.

Figure 11:
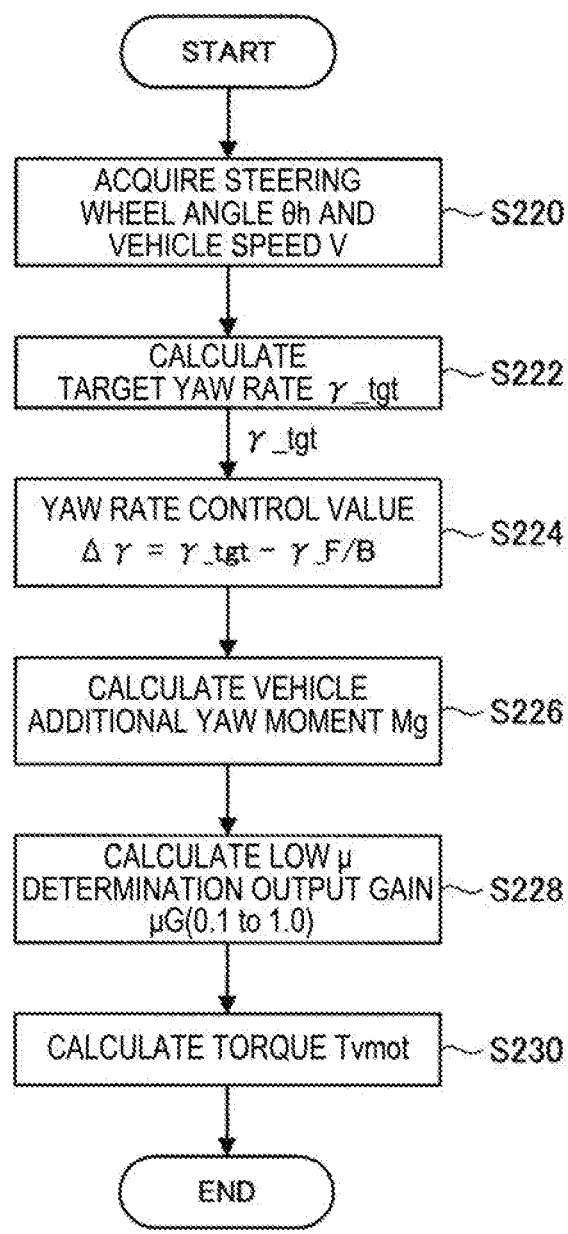
FIG. 11 is a flowchart illustrating a process of calculating an additional torque Tvmot.

FIG. 11 is a flowchart illustrating a process of calculating the additional torque Tvmot. First, at step S220, the target yaw rate calculator 204 acquires the steering wheel angle θh and the vehicle speed V. At next step S222, the target yaw rate γ_tgt is calculated from Eqs. (2) to (4) based on the steering wheel angle θh and the vehicle speed V. At next step S224, the difference Δγ between the target yaw rate γ_tgt and the feedback yaw rate γ_F/B is calculated based on Eq. (7). At next step S226, the vehicle additional yaw moment Mg is calculated from Eq. (9).

At next step S228, the low μ determination output gain calculator 234 calculates the low μ determination output gain μG. At next step S230, ΔTv is calculated based on Eq. (16), and the additional torque Tvmot is calculated based on Eq. (17). Based on the calculated additional torque Tvmot, the motor torque command value for each wheel is calculated at step S124 in FIG. 8.

Figure 12:
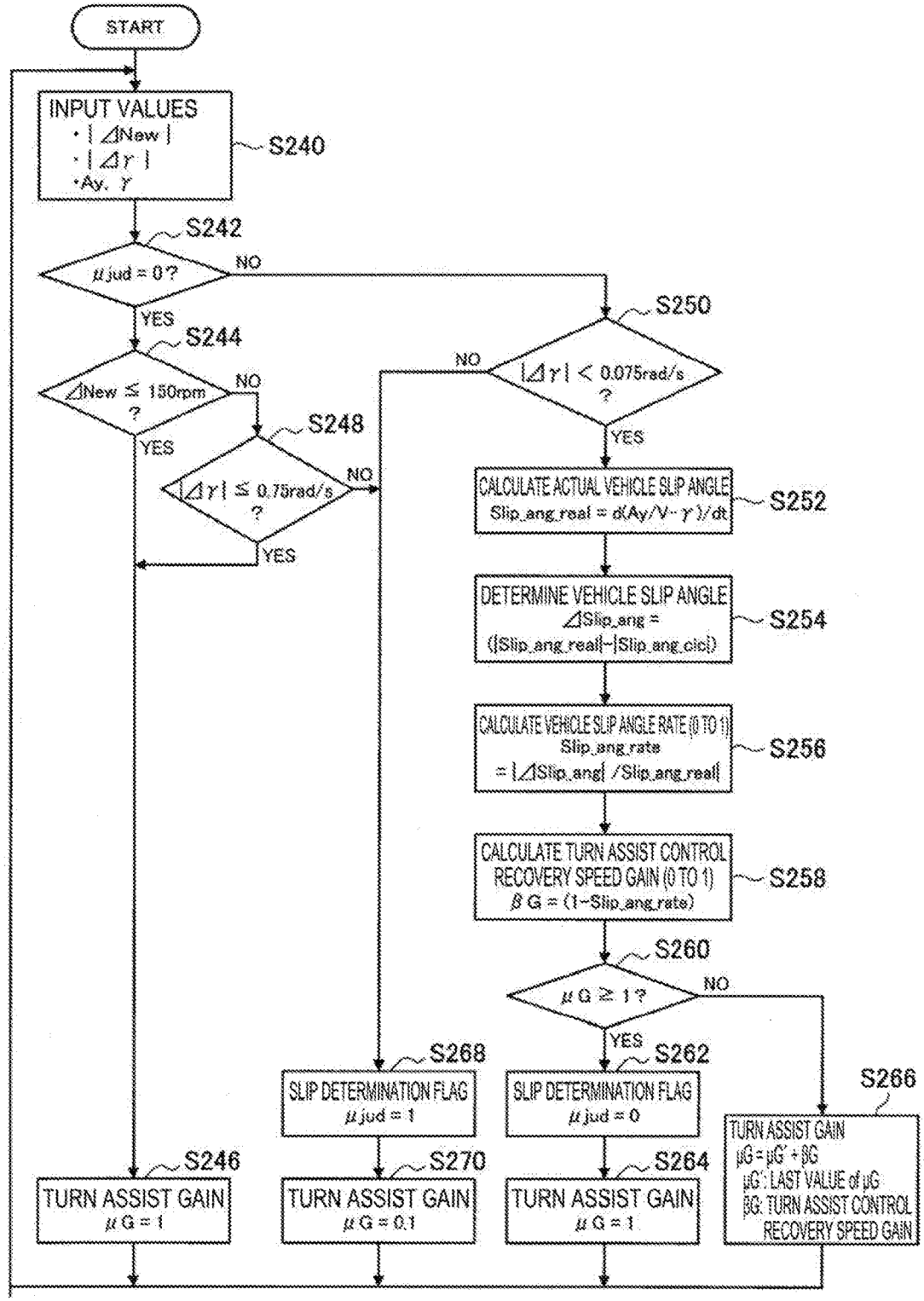
FIG. 12 is a flowchart illustrating a process in which a low μ determination output gain calculator calculates a low μ determination output gain μG.

FIG. 12 is a flowchart illustrating a process in which the low μ determination output gain calculator 234 calculates the low μ determination output gain μG. First, at step S240, the differences Δγ and ΔNew are inputted to the low μ determination output gain calculator 234. In addition, the theoretical vehicle slip angle calculator 222 receives the lateral acceleration Ay and the actual yaw rate γ. At next step S242, the state of the slip determination flag μjud is checked to determine whether μjud=0. If it is determined that μjud=0, which means that the road surface is in a high μ condition and that the vehicle 1000 is not liable to slip, control proceeds to step S244. At step S244, it is determined whether ΔNew≤150 [rpm], and if it is determined that ΔNew≤150 [rpm], control proceeds to step S246. At step S246, the turn assist gain μG is set to 1 (i.e., μG=1). As described above, in the case where the slip determination flag μjud has been set at 0 in the last cycle, it is determined that the road surface is in a high μ condition and that the vehicle 100 is not liable to slip, and the low μ determination output gain (i.e., the turn assist gain) μG is set to 1, if ΔNew is less than 150 [rpm]. As a result, the corrected value Mg' agrees with the vehicle additional yaw moment Mg calculated by the vehicle additional yaw moment calculator 232, and the motor torque command values TqmotFl, TqmotFr, TqmotRl, and TqmotRr for the respective motors 108, 110, 112, and 114 are calculated based on the vehicle additional yaw moment Mg.

Meanwhile, if it is determined at step S244 that ΔNew>150 [rpm], control proceeds to step S248, and it is determined whether |Δγ|≤0.75 [rad/s]. Then, if it is determined that |Δγ|≤0.75 [rad/s], control proceeds to step S246. As described above, even in the case where ΔNew exceeds 150 [rpm], it is determined that the road surface is in a high μ condition and that the vehicle 1000 is not liable to slip if |Δγ|≤0.75 [rad/s]. This contributes to preventing the vehicle 1000 from being determined to be in the slipping condition (i.e., μjud=1) when the vehicle 1000 traveling over a shoulder or the like, for example, has caused ΔNew to temporarily exceed 150 [rpm].

If it is determined at step S242 that μjud=1, control proceeds to step S250. At step S250, it is determined whether |Δγ|<0.075 [rad/s]. Then, if it is determined that |Δγ|<0.075 [rad/s], control proceeds to step S252. In this case, the absolute value of Δγ is sufficiently small to presume that the condition of the road surface has changed from a low μ condition to a high μ condition, and accordingly, a process of recovering the low μ determination output gain μG to or toward 1 is performed in step S252 and subsequent steps.

At step S252, the actual vehicle slip angle Slip_ang_real is calculated based on Eq. (10). At next step S254, the difference ΔSlip_ang is calculated based on Eq. (11).

At next step S256, the vehicle slip angle rate Slip_ang_rate is calculated based on Eq. (12). At next step S258, the turn assist control recovery speed gain βG is calculated based on Eq. (13).

Note that the vehicle slip angle rate Slip_ang_rate is a value obtained by dividing the difference ΔSlip_ang by the actual vehicle slip angle Slip_ang_real, and that, when the vehicle 1000 is in the slipping condition, Slip_ang_real>Slip_ang_clc, and the vehicle slip angle rate Slip_ang_rate accordingly has a value of 1 or less. This allows the value of the turn assist control recovery speed gain βG calculated at step S258 to be in the range of 0 to 1. As the degree of the slip of the vehicle 1000 increases, the turn assist control recovery speed gain βG approaches 0, and as the degree of the slip of the vehicle 1000 decreases, the turn assist control recovery speed gain βG approaches 1. Thus, the speed of the recovery of the low μ determination output gain μG is allowed to vary in accordance with the degree of the slip of the vehicle 1000.

At next step S260, it is determined whether the value of the low μ determination output gain μG is 1 or more, and if it is determined that μG≥1, control proceeds to step S262. At step S262, the slip determination flag μjud is set to 0. At next step S264, the value of the low μ determination output gain μG is set to 1 (i.e., μG=1).

If it is determined at step S260 that μG<1, control proceeds to step S266. At step S266, the low μ determination output gain μG is calculated based on Eq. (15). If a slip occurs while the value of the low μ determination output gain μG increases in successive iterations of step S266, the slip determination flag μjud will be set to 1 at step S268, and the value of the low μ determination output gain μG will be reset to 0.1 at step S270.

Meanwhile, if it is determined at step S250 that |Δγ|≥0.075 [rad/s], control proceeds to step S268. In this case, the absolute value of Δγ is 0.075 [rad/s] or more, and thus it is determined that the vehicle 1000 is still in the slipping condition, and the slip determination flag μjud is set to 1 (i.e., μjud=1) at step S268. Similarly, if it is determined at step S248 that |Δγ|>0.75 [rad/s], control proceeds to step S268. In this case, ΔNew is greater than 150 [rpm] and |Δγ|>0.75 [rad/s], and thus it is determined that the vehicle 1000 is in the slipping condition and that ΔNew has not temporarily exceeded 150 [rpm] because of a shoulder or the like, and the slip determination flag μjud is accordingly set to 1 (i.e., μjud=1) at step S268.

After step S268, control proceeds to step S270. At step S270, the low μ determination output gain μG is set to 0.1 (i.e., μG=0.1). As a result, when the vehicle 1000 is in the slipping condition, the vehicle additional yaw moment Mg is corrected to a value 1/10 times that of the vehicle additional yaw moment Mg. This reduces the longitudinal forces of the rear wheels 104 and 106, and increases the maximum permissible amounts of the lateral forces of the rear wheels 104 and 106. This contributes to preventing an occurrence of oversteer, and stabilizing the behavior of the vehicle 1000.

Figure 13:
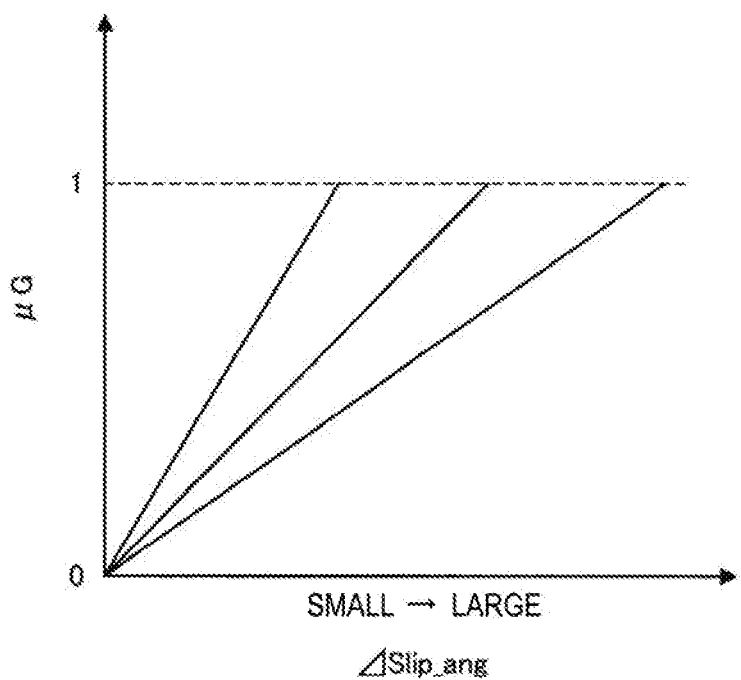
FIG. 13 is a characteristic diagram illustrating how the low μ determination output gain μG increases through successive iterations of a process of step S266 in FIG. 12.

FIG. 13 is a characteristic diagram illustrating how the low μ determination output gain μG increases through successive iterations of the process of step S266 in FIG. 12. As described above, as the vehicle slip angle rate Slip_ang_rate decreases, the value of the turn assist control recovery speed gain βG increases, and the amount of the increase in the low μ determination output gain μG in step S266 increases. In addition, as the value of the difference ΔSlip_ang decreases, the value of the vehicle slip angle rate Slip_ang_rate decreases. Accordingly, as illustrated in FIG. 13, as the value of the difference ΔSlip_ang decreases, the rate of the increase in the low μ determination output gain μG in step S266 increases, allowing a quicker recovery of the low μ determination output gain μG to "1".

As described above, the slipping condition of the vehicle 1000 can be judged based on the value of the difference ΔSlip_ang, and smaller values of the difference ΔSlip_ang, which mean smaller differences between the values of the actual vehicle slip angle Slip_ang_real and the theoretical vehicle slip angle Slip_ang_clc, suggest less severity of the slipping condition of the vehicle 1000. Meanwhile, greater values of the difference ΔSlip_ang, which mean greater differences between the values of the actual vehicle slip angle Slip_ang_real and the theoretical vehicle slip angle Slip_ang_clc, suggest greater severity of the slipping condition of the vehicle 1000. Accordingly, the rate of the increase in the low μ determination output gain μG is arranged to increase as the value of the difference ΔSlip_ang decreases, so that as the degree of the slip of the vehicle 1000 decreases, the rate of the increase in the low μ determination output gain μG increases, allowing a quicker recovery of the low μ determination output gain μG to "1". Moreover, the rate of the increase in the low μ determination output gain μG is arranged to decrease as the value of the difference ΔSlip_ang increases, so that as the degree of the slip of the vehicle 1000 increases, the rate of the increase in the low μ determination output gain μG decreases, which contributes to more effectively preventing the vehicle 1000 from slipping again while the low μ determination output gain μG is being recovered toward "1". As described above, when a condition for the recovery of the low μ determination output gain μG has been fulfilled, the recovery is performed with a varied slope of the recovering slope depending on the difference between the theoretical value and the sensor value of the vehicle slip angle, to prevent successive occurrences of abrupt changes in the motor rotation rate, and to facilitate a quicker recovery to the turn assist control. This contributes to preventing a hunting in the motor rotation rate at the time of a control switch from low μ control to high μ control, and to enhancing the turning performance with a quicker recovery to the turn assist control.

Figure 14:
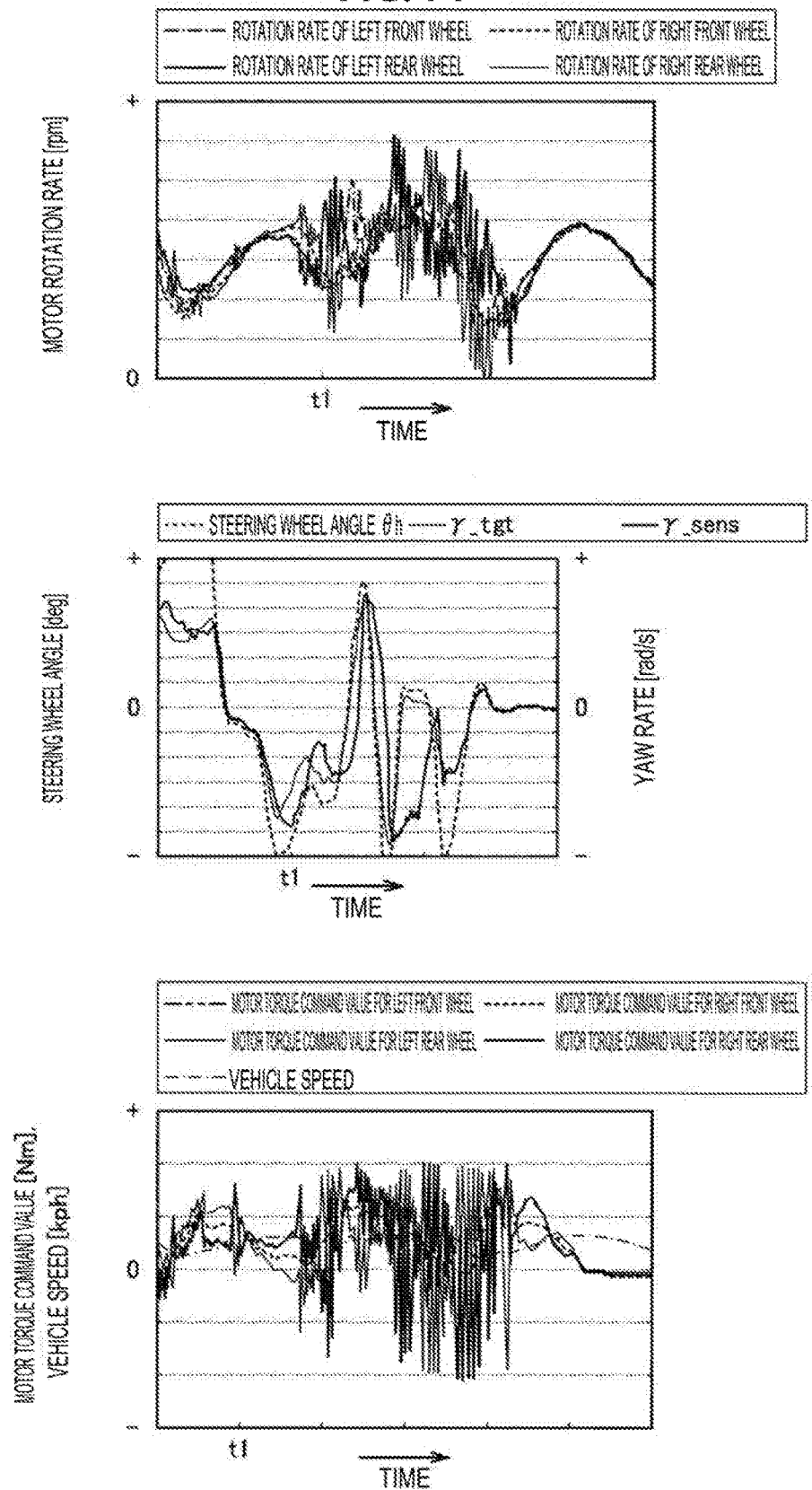
FIG. 14 illustrates characteristic diagrams for explaining beneficial effects that can be achieved by control according to an implementation of the present invention.
Figure 15:
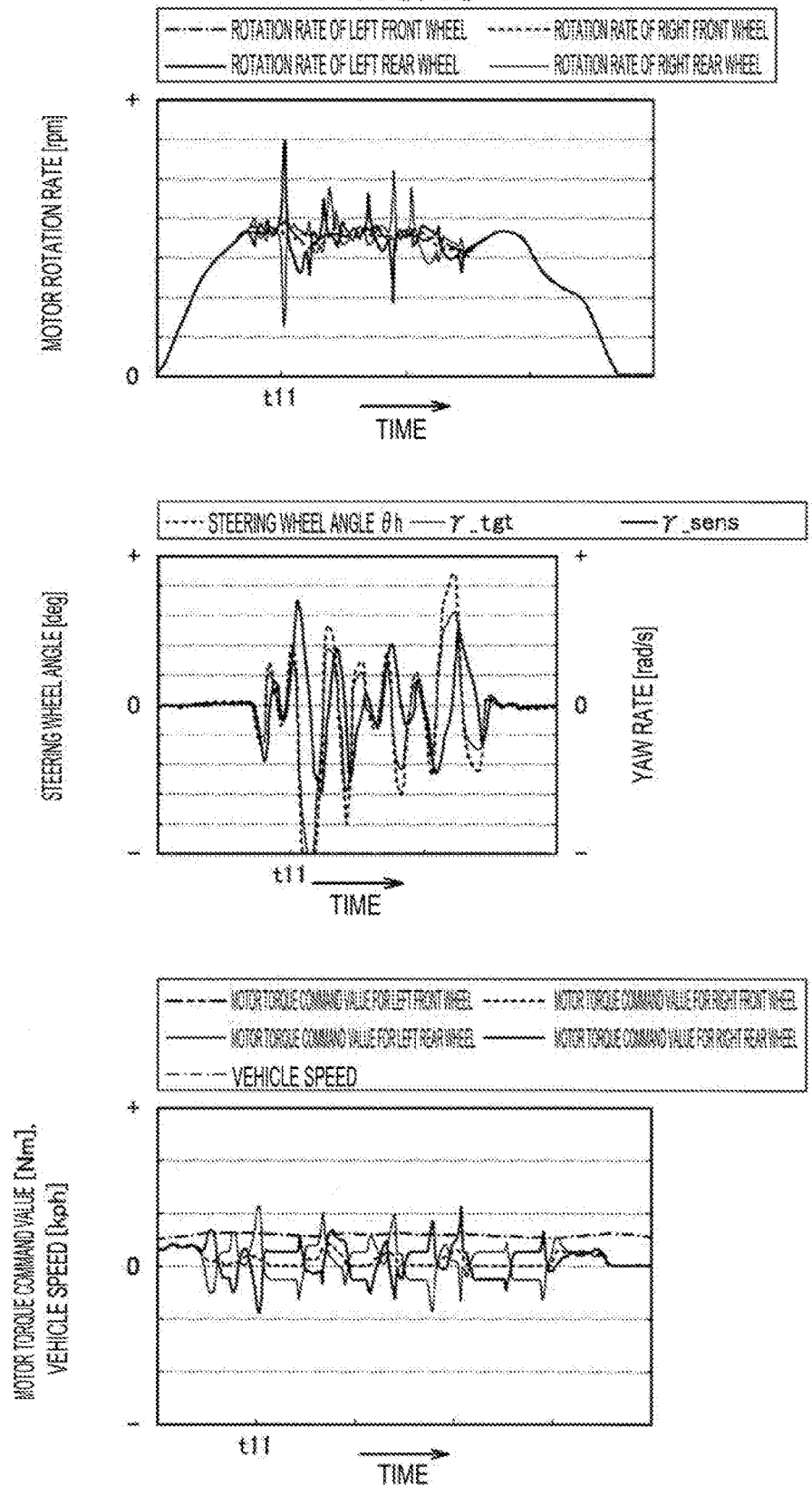
FIG. 15 illustrates characteristic diagrams for explaining the beneficial effects that can be achieved by the control according to an implementation of the present invention.

FIGS. 14 and 15 illustrate characteristic diagrams for explaining beneficial effects that can be achieved by the control according to the present implementation. Here, FIG. 14 illustrates the case where the control according to the present implementation (i.e., gain reductions for the low μ condition, and gain recovery at the time of a change from the low μ condition to the high μ condition) is not performed. Meanwhile, FIG. 15 illustrates the case where the control according to the present implementation is performed. FIGS. 14 and 15 both represent simulations of a slalom drive on a snow-covered road. In each of FIGS. 14 and 15, the top diagram illustrates the rotation rate of the left front wheel, the rotation rate of the right front wheel, the rotation rate of the left rear wheel, and the rotation rate of the right rear wheel individually. In addition, in each of FIGS. 14 and 15, the middle diagram illustrates the steering wheel angle θh, the target yaw rate γ_tgt, and the actual yaw rate γ_sens individually. Further, in each of FIGS. 14 and 15, the bottom diagram illustrates the motor torque command value for the left front wheel, the motor torque command value for the right front wheel, the motor torque command value for the left rear wheel, the motor torque command value for the right rear wheel, and the vehicle speed individually. In each of FIGS. 14 and 15, the horizontal axis represents time, and comparable time domains are adopted along the horizontal axis.

As illustrated in the top diagram in FIG. 14, in the case where the control according to the present implementation is not performed, the value of the low μ determination output gain μG is maintained at 1, and therefore, after time t1, huntings in in the rotation rates of the left and right rear wheels occur such that the rotation rates of the left and right rear wheels greatly vary in opposite directions. Moreover, as illustrated in the bottom diagram in FIG. 14, the motor torque command value for the left rear wheel and the motor torque command value for the right rear wheel exhibit great torque fluctuations.

In contrast, as illustrated in the top diagram in FIG. 15, in the case where the control according to the present implementation is performed, the huntings in the rotation rates of the left and right rear wheels are obviously reduced because, after a significant difference between the rotation rates of the left and right rear wheels occurs at time t11, the value of the low μ determination output gain μG is reduced (i.e., μG=0.1), resulting in a subsequent reduction in the vehicle additional yaw moment. Moreover, as illustrated in the bottom diagram in FIG. 15, the motor torque command value for the left rear wheel and the motor torque command value for the right rear wheel exhibit limited torque fluctuations when compared to those in the bottom diagram in FIG. 14.

As described above, in the case where the control according to the present implementation is performed, if a determination of a change from a low μ condition to a high μ condition is made after the value of the low μ determination output gain μG is reduced, the value of the low μ determination output gain μG is recovered to or toward 1 at a varied rate depending on the degree of the slip, which contributes to effectively preventing huntings in the motor rotation rates and the torque command values.

Furthermore, as illustrated in the middle diagram in FIG. 14, in the case where the control according to the present implementation is not performed, the steering wheel angle θh greatly deviates from the target yaw rate γ_tgt and the actual yaw rate γ_sens, and a deviation of the actual yaw rate γ_sens from the steering wheel angle θh may sometimes cause the driver to perform a countersteering. Thus, a complicated operation of the steering wheel may be required.

In contrast, as illustrated in the middle diagram in FIG. 15, in the case where the control according to the present implementation is performed, the steering wheel angle θh temporarily deviates from the target yaw rate γ_tgt and the actual yaw rate γ_sens near time t11, but after that, the steering wheel angle θh follows the target yaw rate γ_tgt and the actual yaw rate γ_sens. This allows the driver to steer with stability.

As described above, according to the present implementation, when it is determined that the vehicle 1000 is in the slipping condition, the value of the low μ determination output gain μG is reduced to allow increases in the lateral forces of the tires, to securely prevent a slipping condition of the vehicle 1000. In addition, when there is a likelihood that the vehicle 1000 will recover from the slipping condition, the recovery of the value of the low μ determination output gain μG is controlled in accordance with the degree of the slip such that the value of the low μ determination output gain μG will be recovered in a gentle manner if the degree of the slip is large, and the value of the low μ determination output gain μG will be recovered more quickly if the degree of the slip is small. This contributes to securely preventing a sharp change in the low μ determination output gain μG from causing a hunting in the rotation rate of any motor, and to enhancing the turning performance with a quick recovery of the longitudinal forces when the degree of the slip is small.

Although the preferred implementations of the present invention have been described in detail with reference to the appended drawings, the present invention is not limited thereto. It is obvious to those skilled in the art that various modifications or variations are possible insofar as they are within the technical scope of the appended claims or the equivalents thereof. It should be understood that such modifications or variations are also within the technical scope of the present invention.

The invention claimed is:

1. An apparatus, comprising:
    a controller configured to:
        calculate, based on a yaw rate of a vehicle, a vehicle additional yaw moment to be applied to the vehicle independently of a steering system;
        calculate a theoretical vehicle slip angle based on a vehicle model;
        calculate an actual vehicle slip angle of the vehicle based on a sensor value;
        determine a slipping condition of the vehicle;
        calculate an adjustment gain to adjust the vehicle additional yaw moment so as to reduce the vehicle additional yaw moment when the vehicle is determined to be in the slipping condition;
        increase the adjustment gain in accordance with a degree of a slip of the vehicle when the vehicle is determined to recover from the slipping condition, wherein the adjustment gain is increased based on a difference between the theoretical vehicle slip angle and the actual vehicle slip angle, and wherein a rate of the increase in the adjustment gain decreases as the difference between the theoretical vehicle slip angle and the actual vehicle slip angle increases; and add a recovery gain, decided based on the difference between the theoretical vehicle slip angle and the actual vehicle slip angle, to a most recent value of the adjustment gain to increase the adjustment gain, wherein the recovery gain is added in every iteration of a process to calculate the adjustment gain in a control cycle; and a power steering actuator configured to control the vehicle based on the vehicle additional yaw moment.

2. The apparatus according to claim 1, wherein the controller is further configured to calculate a vehicle slip angle rate based on division of the difference between the theoretical vehicle slip angle and the actual vehicle slip angle by the actual vehicle slip angle, and wherein the recovery gain is decided based on the vehicle slip angle rate.

3. The apparatus according to claim 1, wherein the slipping condition is determined based on a difference between rotation rates of left and right wheels of the vehicle.

4. The apparatus according to claim 3, wherein the slipping condition is determined based on a difference between a theoretical difference between the rotation rates of the left and right wheels calculated from the vehicle model and an actual difference between the rotation rates of the left and right wheels measured from sensors.

5. The apparatus according to claim 4, wherein the slipping condition is determined based on a difference between a target yaw rate of the vehicle and a feedback yaw rate for the target yaw rate in addition to the difference between the rotation rates of the left and right wheels.

6. The apparatus to claim 3, wherein the slipping condition is determined based on a difference between a target yaw rate of the vehicle and a feedback yaw rate for the target yaw rate in addition to the difference between the rotation rates of the left and right wheels.

7. The apparatus according to claim 1, further comprising:

a yaw rate sensor configured to measure an actual yaw rate of the vehicle, wherein the controller is further configured to:

calculate a target yaw rate based on a steering wheel angle and a vehicle speed;

calculate a yaw rate model value from the vehicle model;

calculate a feedback yaw rate from the yaw rate model value and the actual yaw rate with distributions of the yaw rate model value and the actual yaw rate based on a difference between the yaw rate model value and the actual yaw rate; and calculate the vehicle additional yaw moment based on a difference between the target yaw rate and the feedback yaw rate.

8. The apparatus according to claim 1, wherein the controller is further configured to calculate required motor torques to individually control motors that drive respective left and right rear wheels of the vehicle based on the vehicle additional yaw moment.

9. A method, comprising:

calculating, based on a yaw rate of a vehicle, a vehicle additional yaw moment to be applied to the vehicle independently of a steering system;

calculating a theoretical vehicle slip angle based on a vehicle model;

calculating an actual vehicle slip angle of the vehicle based on a sensor value;

determining a slipping condition of the vehicle;

calculating an adjustment gain to adjust the vehicle additional yaw moment so as to reduce the vehicle additional yaw moment when the vehicle is determined to be in the slipping condition;

increasing the adjustment gain in accordance with a degree of a slip of the vehicle when the vehicle is determined to recover from the slipping condition, wherein the adjustment gain is increased based on a difference between the theoretical vehicle slip angle and the actual vehicle slip angle, and wherein a rate of the increase in the adjustment gain decreases as the difference between the theoretical vehicle slip angle and the actual vehicle slip angle increases; and adding a recovery gain, decided based on the difference between the theoretical vehicle slip angle and the actual vehicle slip angle, to a most recent value of the adjustment gain to increase the adjustment gain, wherein the recovery gain is added in every iteration of a process to calculate the adjustment gain in a control cycle; and controlling the vehicle based on the vehicle additional yaw moment.

10. An apparatus, comprising:

circuitry configured to:

calculate, based on a yaw rate of a vehicle, a vehicle additional yaw moment to be applied to the vehicle independently of a steering system;

calculate a theoretical vehicle slip angle based on a vehicle model;

calculate an actual vehicle slip angle of the vehicle based on a sensor value;

determine a slipping condition of the vehicle;

calculate an adjustment gain to adjust the vehicle additional yaw moment so as to reduce the vehicle additional yaw moment when the vehicle is determined to be in the slipping condition;

increase the adjustment gain in accordance with a degree of a slip of the vehicle when the vehicle is determined to recover from the slipping condition, wherein the adjustment gain is increased based on a difference between the theoretical vehicle slip angle and the actual vehicle slip angle, and wherein a rate of the increase in the adjustment gain decreases as the difference between the theoretical vehicle slip angle and the actual vehicle slip angle increases; and add a recovery gain, decided based on the difference between the theoretical vehicle slip angle and the actual vehicle slip angle, to a most recent value of the adjustment gain to increase the adjustment gain, wherein the recovery gain is added in every iteration of a process to calculate the adjustment gain in a control cycle; and a power steering actuator configured to control the vehicle based on the vehicle additional yaw moment.

* * * * *